United States Patent
Yokoohji

(10) Patent No.: US 10,261,737 B1
(45) Date of Patent: Apr. 16, 2019

(54) PRINT MANAGEMENT METHOD, APPARATUS, AND COMPUTER-READABLE MEDIUM

(71) Applicant: Konica Minolta Laboratory U.S.A., Inc., San Mateo, CA (US)

(72) Inventor: Ryoichi Yokoohji, San Mateo, CA (US)

(73) Assignee: KONICA MINOLTA LABORATORY U.S.A., INC, San Mateo, CA (US)

( * ) Notice: Subject to any disclaimer, the term of this patent is extended or adjusted under 35 U.S.C. 154(b) by 0 days.

(21) Appl. No.: 15/727,348

(22) Filed: Oct. 6, 2017

(51) Int. Cl.
*G06F 3/12* (2006.01)

(52) U.S. Cl.
CPC ............ *G06F 3/124* (2013.01); *G06F 3/1205* (2013.01); *G06F 3/1206* (2013.01); *G06F 3/1241* (2013.01)

(58) Field of Classification Search
CPC ........ G06F 3/121; G06F 3/126; G06F 3/1288; G06F 3/1207; G06F 3/1259; G06F 3/1204; G06F 3/1205; G06F 3/1219; G06F 3/1274; G06F 3/1275; G06F 3/1282
USPC ........ 358/1.15, 1.13, 1.14, 1.9, 2.1; 709/206
See application file for complete search history.

(56) References Cited

U.S. PATENT DOCUMENTS

| | | | | |
|---|---|---|---|---|
| 6,621,589 B1* | 9/2003 | Al-Kazily | ............. | G06F 3/1205 358/1.15 |
| 2002/0113999 A1* | 8/2002 | Sato | ..................... | G06Q 10/087 358/1.15 |
| 2003/0095283 A1* | 5/2003 | Nakajima | .......... | H04N 1/00132 358/1.15 |
| 2003/0174360 A1* | 9/2003 | Ohshima | ............... | G06F 3/1203 358/1.15 |
| 2004/0061890 A1* | 4/2004 | Ferlitsch | ............... | G06F 3/1205 358/1.15 |
| 2006/0285772 A1* | 12/2006 | Hull | ........................ | G06F 21/78 382/305 |
| 2009/0257084 A1* | 10/2009 | Sakamoto | ............. | G06F 3/1208 358/1.15 |
| 2009/0316190 A1* | 12/2009 | Nakagawa | ......... | G03G 15/5075 358/1.15 |
| 2010/0053664 A1* | 3/2010 | Mandel | .................. | G06F 3/1211 358/1.15 |
| 2010/0165376 A1* | 7/2010 | Matsuyama | .......... | G06F 3/1215 358/1.14 |
| 2012/0218594 A1* | 8/2012 | Komine | ................. | G06F 3/1211 358/1.15 |
| 2012/0307275 A1* | 12/2012 | Tamashima | ........... | G06F 3/1205 358/1.13 |
| 2015/0277831 A1* | 10/2015 | Kuranoshita | ......... | G06F 3/1268 358/1.15 |
| 2017/0060506 A1* | 3/2017 | Krikke | .................. | G06F 3/1205 |
| 2018/0088875 A1* | 3/2018 | Yoshida | ................ | G06F 3/1217 |

* cited by examiner

*Primary Examiner* — Negussie Worku
(74) *Attorney, Agent, or Firm* — Squire Patton Boggs (US) LLP

(57) ABSTRACT

A print management method involves a print server using one or more plug-ins to instruct plural output devices to execute child jobs that were split from a single print order. The plug-in can be a group plug-in that enables the print server to communicate with the plural output devices to complete the single print order. The plural output devices can be two printing machines, or one printing machine and one finishing machine.

20 Claims, 20 Drawing Sheets

PRINT MANAGEMENT METHOD, APPARATUS, AND COMPUTER-READABLE MEDIUM

FIELD

This disclosure relates generally to image processing and, more particularly, to print management involving multiple printing and/or finishing machines.

BACKGROUND

Cluster printing involves the use of multiple machines to complete a print job. For example, a print job may have a very large number of pages, so printing may be distributed to multiple printing machines for faster completion time. A print job may have some pages requiring color, which can be distributed to a color printer while other pages not requiring color (BW pages) can be distributed to a black-and-white only printer. In this way, the run time of the color printer is not wasted on BW pages. Also, a print job may involve printing and a subsequent finishing operation, such as stapling, collating, hole punching, folding, and/or binding. The printing operation can be distributed to a printer, and the finishing operation can be distributed to a dedicated finishing machine. Splitting operations in this way can help balance operations in a print shop to reduce idle time and help avoid workflow bottlenecks at a particular machine.

A print server may perform print management to identify printing and finishing machines appropriate for a print job. The process of identifying appropriate machines for cluster printing can become complicated when the server must work with a large number of possible printing and finishing machines having diverse capabilities and constraints. The job ticket created by a conventional server, even with the help of user input, may be missing a parameter required by a printing or finishing machine. Also, the job ticket may have many parameters which do not apply to a printing or finishing machine. Situations like these and others may decrease the efficiency of the print server.

Another issue with conventional cluster print management is that new models of printing and finishing machines are constantly being developed, and it is contemplated that capabilities not previously seen could be introduced. To handle a new model, the cluster print management software in the server usually needs to be updated by a software engineer, which can increases the complexity of the software, which can in turn make it more time consuming to make updates for new models in the future.

The issues related to proper job ticket creation and efficiency discussed above for cluster printing also apply to print jobs that are not subject to cluster printing. Even when a client user does not designate a print job for cluster printing, issues related to missing parameters and/or unnecessary parameters can decrease efficiency significantly, particularly in high volume printing operations.

SUMMARY

Briefly and in general terms, the present invention is directed to a method, print server, and non-transitory computer readable medium for print management.

In aspects of the invention, a print management method comprises receiving a print order at a print server, determining whether the received print order is to be split among plural output devices, the plural output devices including a first output device and a second output device, determining whether the print server has a group plug-in corresponding to both the first output device and the second output device, the group plug-in enabling the print server to communicate with both the first output device and the second output device to complete the print order, creating a first child job and a second child job from the print order, assigning the first child job to the first output device, assigning the second child job to the second output device, when the print server is determined to have the group plug-in, completing the print order by using the group plug-in to instruct the first output device to execute the first child job and to instruct the second output device to execute the second child job, and when the print server is determined to not have the group plug-in, completing the print order by using a first plug-in to instruct the first output device to execute the first child job, and using a second plug-in to instruct the second output device to execute the second child job.

In aspects of the invention, a print server is in communication with plural output devices, print server executing a print management program to perform a print management method. The print management method comprises receiving a print order at a print server, determining whether the received print order is to be split among the plural output devices, the plural output devices including a first output device and a second output device, determining whether the print server has a group plug-in corresponding to both the first output device and the second output device, the group plug-in enabling the print server to communicate with both the first output device and the second output device to complete the print order, creating a first child job and a second child job from the print order, assigning the first child job to the first output device, assigning the second child job to the second output device, when the print server is determined to have the group plug-in, completing the print order by using the group plug-in to instruct the first output device to execute the first child job and to instruct the second output device to execute the second child job, and when the print server is determined to not have the group plug-in, completing the print order by using a first plug-in to instruct the first output device to execute the first child job, and using a second plug-in to instruct the second output device to execute the second child job.

In aspects of the invention, a non-transitory computer readable medium has stored thereon computer readable instructions that, when executed by a server processor of print server, cause the print server to perform a process for print management. The process comprises receiving a print order at a print server, determining whether the received print order is to be split among plural output devices, the plural output devices including a first output device and a second output device, determining whether the print server has a group plug-in corresponding to both the first output device and the second output device, the group plug-in enabling the print server to communicate with both the first output device and the second output device to complete the print order, creating a first child job and a second child job from the print order, assigning the first child job to the first output device, assigning the second child job to the second output device, when the print server is determined to have the group plug-in, completing the print order by using the group plug-in to instruct the first output device to execute the first child job and to instruct the second output device to execute the second child job, and when the print server is determined to not have the group plug-in, completing the print order by using a first plug-in to instruct the first output device to execute the first child job, and using a second plug-in to instruct the second output device to execute the second child job.

The features and advantages of the invention will be more readily understood from the following detailed description which should be read in conjunction with the accompanying drawings.

BRIEF DESCRIPTION I/F THE DRAWINGS

DETAILED DESCRIPTION

Figure 1:
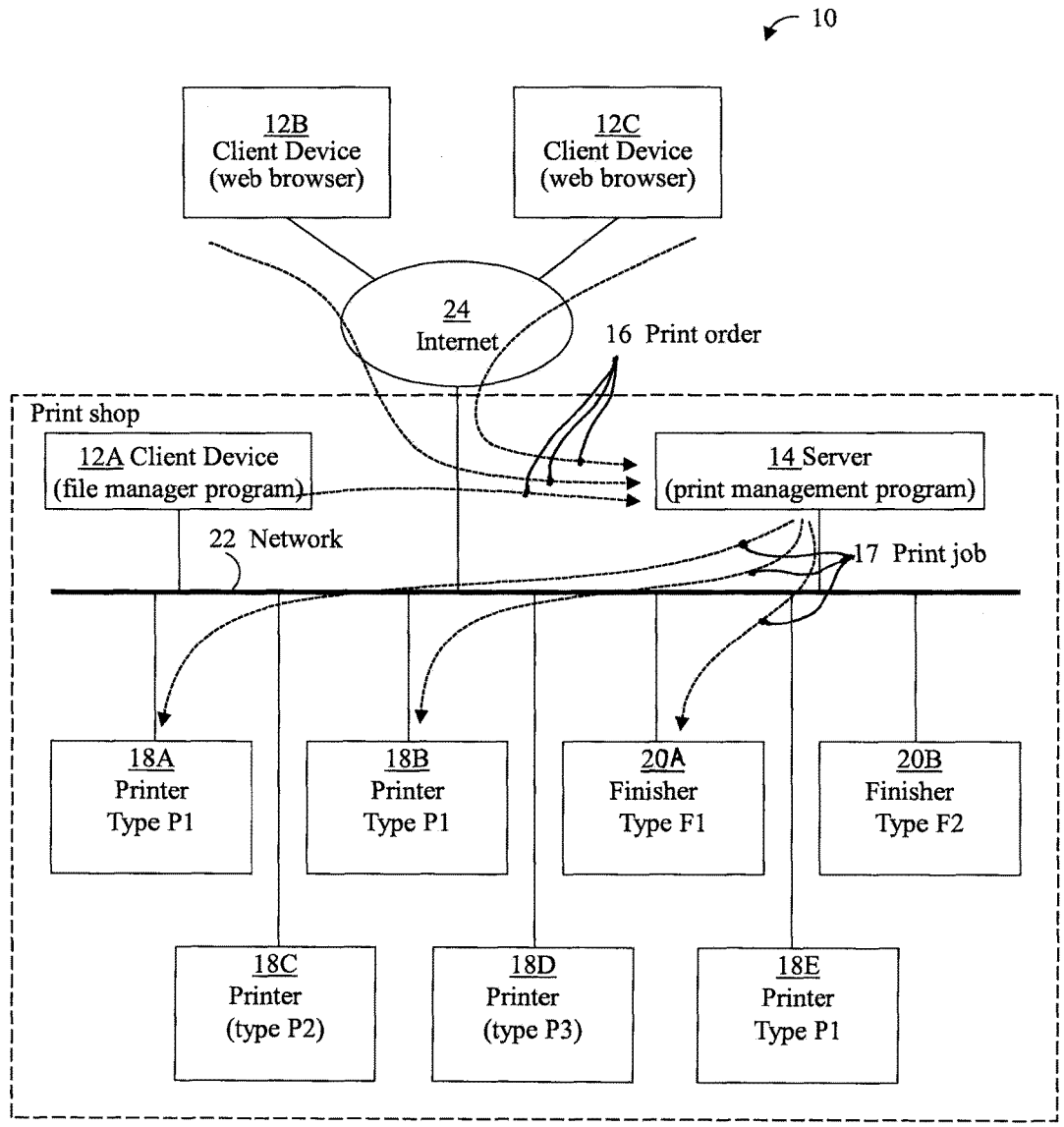
FIG. 1 is a schematic block diagram showing an example system for print management.

Referring now in more detail to the example drawings for purposes of illustrating aspects of the invention, wherein like reference numerals designate corresponding or like elements among the several views, there is shown in FIG. 1 example system 10 for print management.

System 10 includes client devices 12, print server 14 (abbreviated as server 14), and printing machines 18 (abbreviated as printers 18), and finishing machines 20 (abbreviated as finishers 20). Some of these system elements are labeled in the figures using numerals and letters (e.g., 18A, 18B, 18C) to distinguish particular elements within the group. Numerals without letters refer to any or all members of the group.

Client devices 12 communicate with server 14 to have print orders 16 completed by printers 18 and finishers 20. Each print order 16 can be request to print a single copy document, or a request to print multiple copies of a single document. Printing and finishing requirements (collectively referred to as print process requirements) in print orders 16 are not in a format that can be understood and used by printers 18 and finishers 20. Server 14 translates print orders 16 to print jobs 17 having print process requirements in a format that can be understood and used by printers 18 and finishers 20.

A print shop, such as one in an office or building, may house server 14, printers 18, and finishers 20. The print shop can be a commercial establishment that takes print orders 16 from a variety of organizations, such as hospitals, schools, and financial institutions. The print shop can be a department within a large organization, such as a government agency or large corporation, in need of high speed and high volume printing services. The print shop has client device 12A which can send print orders 16 to server 14 via network 22, such as a local or wide area network. Other client devices 12B and 12C are located remotely from the print shop and may send print orders 16 to server 14 via the Internet 24 and network 22. Server 14 sends print jobs 17 to printers 18 and finishers 20 via network 22.

Figure 2:
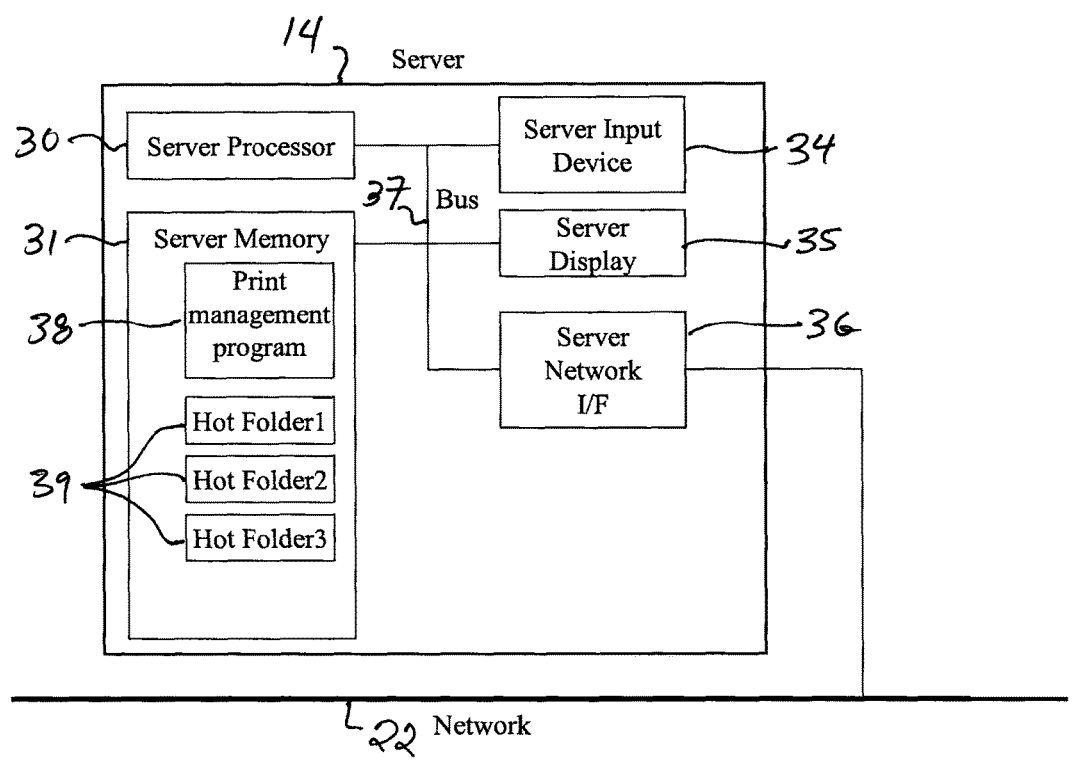
FIG. 2 is a schematic block diagram showing an example print server of FIG. 1.

As shown in FIG. 2, server 14 includes one or more computer processors 30, one or more memory devices 31, one or more input devices 34, server display 35, and server network interface 36 which are interconnected via data communication bus 37. The one or more computer processors 30 are collectively referred to as server processor 30. Server processor 30 includes circuits and electronic components that execute instructions within print management program 38 for performing the methods described herein.

The one or more computer memory devices 31 are collectively referred to as server memory 31. Server memory 31 includes any one or a combination of random-access memory (RAM) modules, read-only memory (ROM) modules, and other electronic data storage devices. Server memory 31 may include a mass storage type of device such as an optical CD or DVD drive, magnetic hard disk drive, or solid-state flash drive. Server memory 31 includes a non-transitory computer readable medium that stores print management program 38.

Server memory 31 stores a file system comprising hot folders 39. Hot folders 39 are monitored by print management program 38, which is executed by server processor 30, such that a new file that arrives in any of the hot folders is processed by print management program 38.

The one or more input devices 34 are collectively referred to as server input device 34. Server input device 34 may include any one or more of a keyboard with buttons, touch-sensitive screen, mouse, electronic pen, microphone, and other means of user input. Server display 35 may include a liquid crystal display, projector, or other type of visual display device. Server input device 34 and display 35 may be used by a server-side user (such as a print shop administrator) to run print management program 38 and to install plug-ins described below.

Server network interface (I/F) 36 is configured to allow server 14 to communicate with client devices 12, printers 18, and finishers 20 through network 22 and the Internet 24. Server network I/F 36 includes circuits and electronic components configured for data communication through network 22. Server network I/F 36 enables server 14 to receive print orders 16, and optionally plug-ins, from client devices 12.

Figure 3:
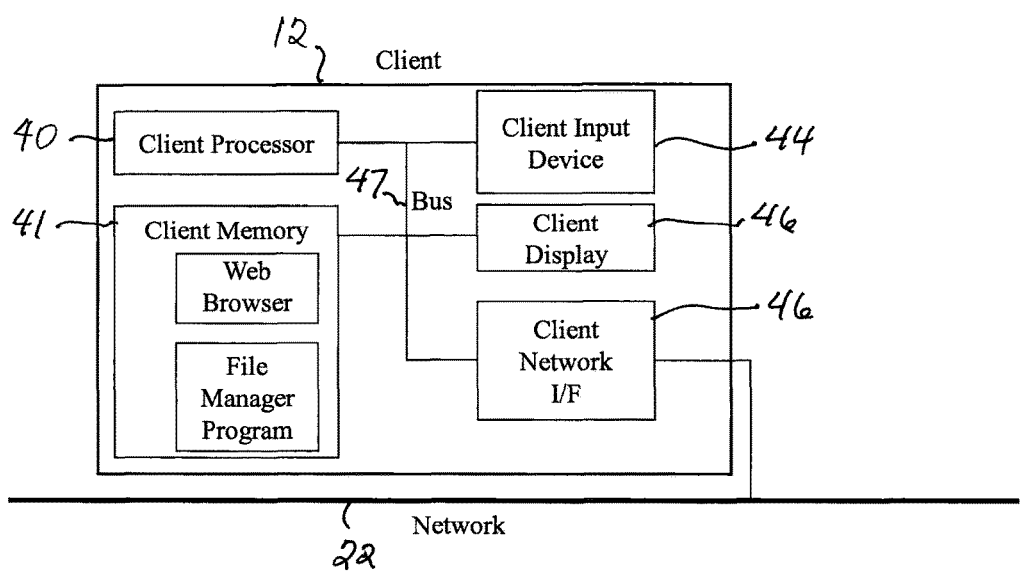
FIG. 3 is a schematic block diagram showing an example client device of FIG. 1.

As shown in FIG. 3, client device 12 includes one or more computer processors 40, one or more memory devices 41, one or more input devices 44, client display 45, and client network interface 46 which are interconnected via data communication bus 47. For example, client device 12 can be a computer workstation, laptop computer, tablet, or smartphone. The one or more computer processors 40 are collectively referred to as client processor 40. Client processor 40 includes circuits and electronic components that execute instructions of a web browser program and/or a file manager program.

The one or more computer memory devices 41 are collectively referred to as client memory 41. Client memory 41 includes any one or a combination of random-access memory (RAM) modules, read-only memory (ROM) modules, and other electronic data storage devices. Client memory 41 may include a mass storage type of device such as an optical CD or DVD drive, magnetic hard disk drive, or solid-state flash drive. Client memory 41 includes a non-transitory computer readable medium that optionally stores files associated with a file manager program, such as Windows Explorer. For example, client device 12A (FIG. 1) may run the file manager program to allow a client-side user to drag and drop a printing source file in any one of hot folders 39 (FIG. 2) managed by server 14. The client-side user can be an employee of the print shop. A printing source file contains data that the client-side user wants to have printed. The data may correspond to a photograph, illustration, and/or text. A printing source file can be a single PDF file, JPG file, or other format. The drag and drop operation by the client-side user causes client device 12A to send the printing source file to server 14. By default, each hot folder 39 has associated with it a data set of print process requirements that establishes whether the contents of the printing source file will be subjected to 2-sided printing, for example. Other example print process requirements include, without limitation: paper type, paper size, color or BW printing, output resolution or quality, and finishing such as stapling, collating, hole punching, folding, and stitching.

The non-transitory computer readable medium of client memory 41 may store files associated with a web browser. For example, each of client devices 12B and 12C (FIG. 1) may run the web browser, which provides a web-based user interface (U/I) with which a client-side user creates print orders 16. The client-side user can be print shop customer located remotely from the print shop. Each print order 16 from client devices 12B and 12C includes a printing source file and a data set of print process requirements, which are to be used when printing and/or finishing. Such print orders 16 created by the client-side user are sent by the web browser of client device 12 to server 14.

The one or more input devices 44 are collectively referred to as client input device 44. Client input device 44 may include any one or more of a keyboard with buttons, touch-sensitive screen, mouse, electronic pen, microphone, and other means of user input. Client display 45 may include a liquid crystal display, projector, or other type of visual display device. Client input device 44 and display 45 may be used by the client-side user to interact with the web browser or file manager program of client device 12 to send print order 16 to server 14.

Client network interface (I/F) 46 is configured to allow client device 12 to communicate with server 14 through network 22 and the Internet 24. Client network I/F 46 includes circuits and electronic components configured for data communication through network 22. Client network I/F 46 enables client device 12 to send print orders 16, and optionally plug-ins, to server 14.

Figure 4:
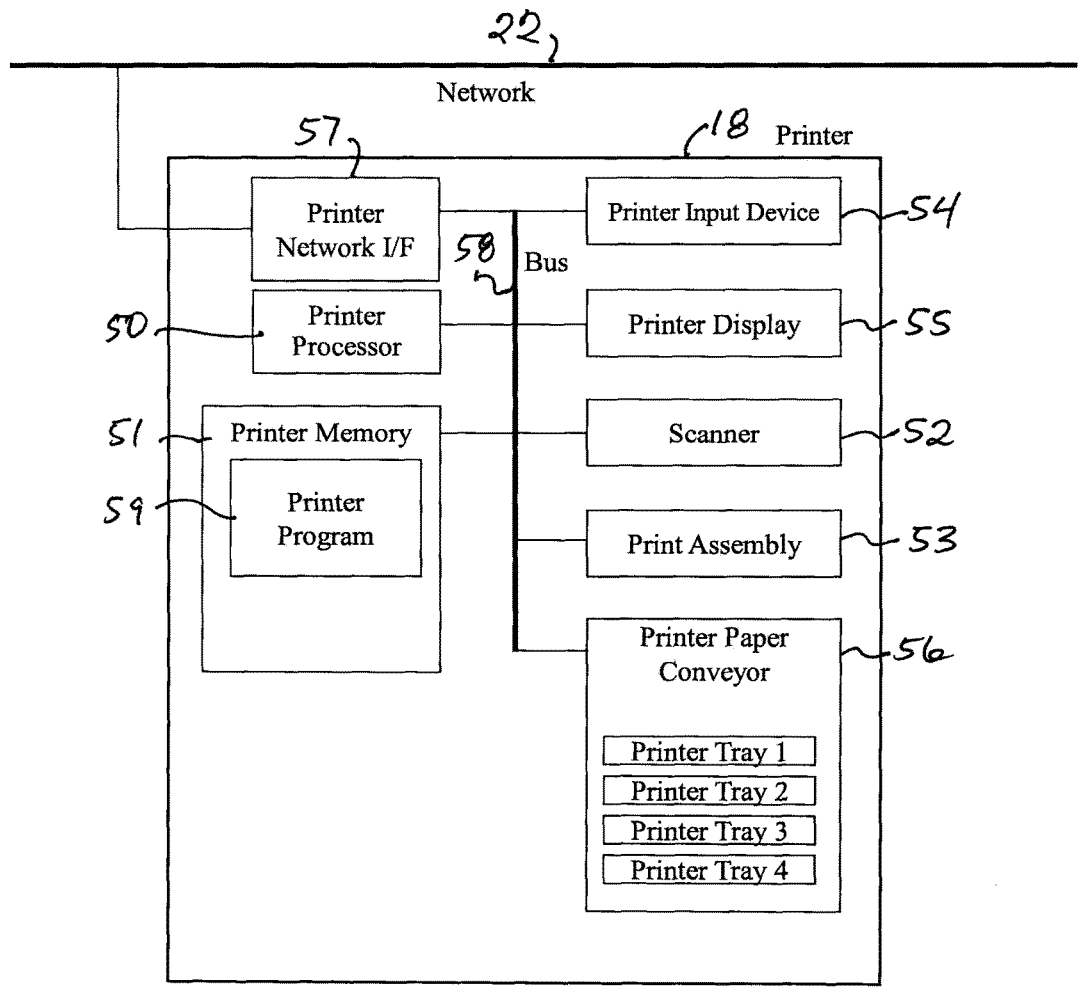
FIG. 4 is a schematic block diagram showing an example printer of FIG. 1.

As shown in FIG. 4, printer 18 includes one or more computer processors 50, one or more memory devices 51, scanner 52, print assembly 53, one or more input devices 54, printer display 55, printer paper conveyor 56, and printer network interface 57. These machine elements of printer 18 are interconnected via data communication bus 58. The one or more computer processors 50 are collectively referred to as printer processor 50. Printer processor 50 includes circuits and electronic components that execute instructions within printer program 59 for controlling the above-mentioned machine elements of printer 18.

The one or more computer memory devices 51 are collectively referred to as printer memory 51. Printer memory 51 includes any one or a combination of random-access memory (RAM) modules, read-only memory (ROM) modules, and other electronic data storage devices. Printer memory 51 may include a mass storage type of device such as an optical CD or DVD drive, magnetic hard disk drive, or solid-state flash drive. Printer memory 51 includes a non-transitory computer readable medium that stores files associated with printer program 59. The non-transitory computer readable medium of printer memory 51 may also store data for print job 17 received by printer 18 from server 14. The data for a print job sent to a printer includes a job ticket and a printing language file that will be described below.

Scanner 52 reads optical information of images on pages of a physical document placed by a user on printer 18. Light is emitted by scanner 52, which is reflected by the pages. Scanner 52 senses the reflected light and converts it to electrical or digital information, which can be used to print pages that are duplicates of those of the physical document. Other scanning techniques may be used. Some printers 18 may not have a scanner.

For example, print order 16 may involve making one or more duplicate copies of a physical document that is brought to a print shop by a customer. Scanner 12 is used to create a printing source file of the physical document, which is sent by printer 18 to server 14. The customer may tell a print shop employee what the print process requirements are, and then the employee may use the input device of client device 12A or server 14 to create a data set of print process requirements and associate that data set with the printing source file of the physical document. Included in the print process requirements is whether cluster printing is permitted. Thereafter, server 14 will determine the machines (one or more printers 18 and finishers 20, as appropriate) that will complete print order 16.

Print assembly 53 prints images on sheets of paper. The images can be based on information received from scanner 52 or server 14. For example, print assembly 53 generates an electrostatic latent image on a rotating transfer device, which receives toner on the latent image and then transfers the toner to a sheet of paper. Other printing techniques may be used, such as ink jet printing.

The one or more input devices 54 are collectively referred to as printer input device 54. Printer input device 54 may include any one or more of a keyboard with buttons, touch-sensitive screen, mouse, electronic pen, microphone, and other means of user input. Printer display 55 may include a liquid crystal display, projector, or other type of visual display device. Printer input device 54 and display 55 may be used by a user (such as a printer operator working in the print shop) to adjust operation of printer 18.

Printer paper conveyor 56 includes rollers, belts, and mechanical guides that obtain sheets of paper from the appropriate printer trays and conveys the sheets to print assembly 53. The printer trays may contain papers differing in size, material type, and weight. The rollers, belts, and mechanical guides are actuated by various motors that are electrically controlled based on signals generated by printer processor 50. Printer processor 50 determines the appropriate printer tray from which to obtain a sheet of paper based on the print process requirements of print job 17 received by printer 18.

Printer network interface (I/F) 57 is configured to allow printer 18 to communicate with server 14 through network 22. Printer network I/F 57 includes circuits and electronic components configured for data communication through network 22. Printer network I/F 57 enables printer 18 to receive print jobs 17 from server 14. Each print job to a printer includes a printing language file (discussed below) and a job ticket that that defines print process requirements relevant to that printer.

Figure 5:
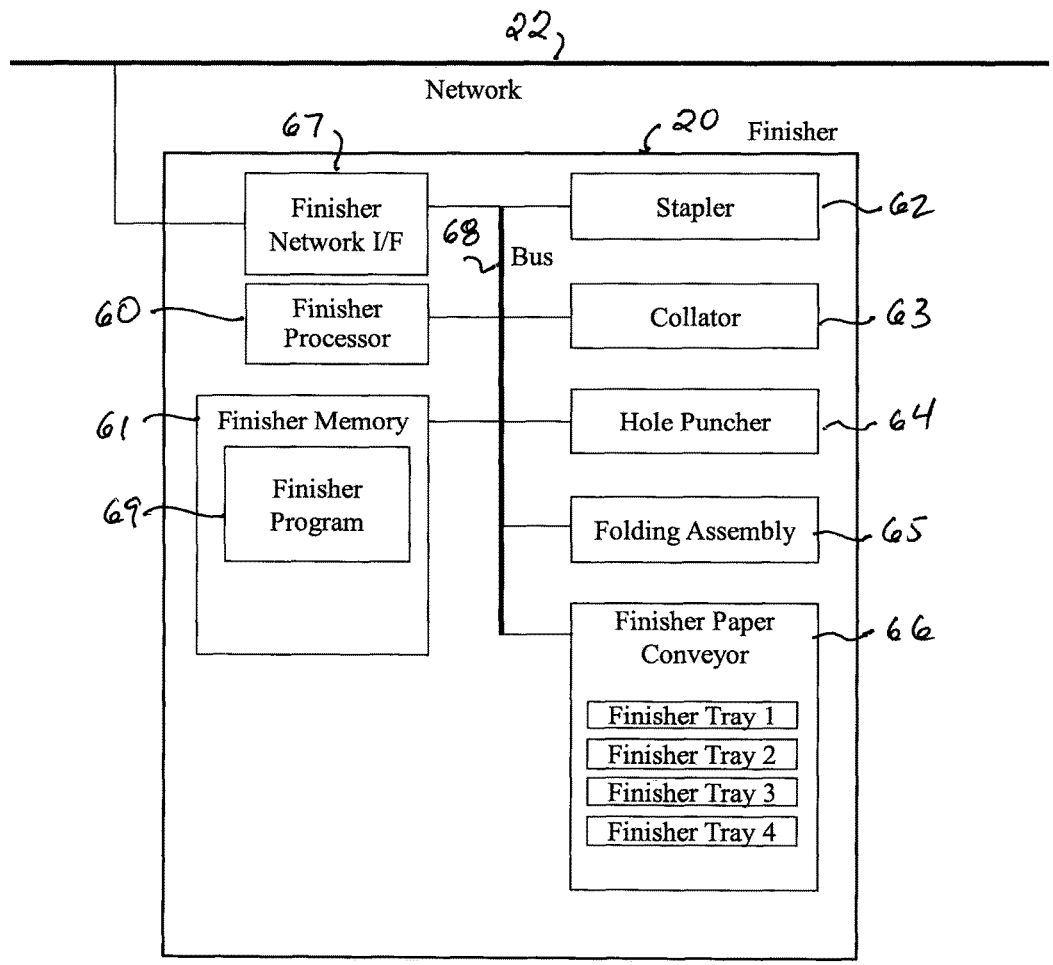
FIG. 5 is a schematic block diagram showing an example finisher of FIG. 1.

As shown in FIG. 5, finisher 20 includes one or more computer processors 60, one or more memory devices 61, stapler 62, collator 63, hole puncher 64, folding assembly 65, finisher paper conveyor 66, and finisher network interface 67. These machine elements of finisher 20 are interconnected via data communication bus 68. The one or more computer processors 60 are collectively referred to as finisher processor 60. Finisher processor 60 includes circuits and electronic components that execute instructions within finisher program 69 for controlling the above-mentioned machine elements of finisher 20.

The one or more computer memory devices 61 are collectively referred to as finisher memory 61. Finisher memory 61 includes any one or a combination of random-access memory (RAM) modules, read-only memory (ROM) modules, and other electronic data storage devices. Finisher memory 61 may include a mass storage type of device such as an optical CD or DVD drive, magnetic hard disk drive, or solid-state flash drive. Finisher memory 61 includes a non-transitory computer readable medium that stores files associated with finisher program 69. The non-transitory computer readable medium of finisher memory 61 may also store data for print jobs 17 received by finisher 20 from server 14. The data for a print job sent to a finisher includes a job ticket, which will be described below.

Stapler 62 is configured to staple sheets of paper together. For example, stapler 62 includes a pusher that pushes a cartridge of metal staples toward a driver which, when actuated, pushes one staple into two or more printed sheets. The driver is actuated by a stapler motor that is electrically controlled based on a signal generated by finisher processor 60. Alternatively, stapler 62 may have other mechanisms known in the art for driving a staple into paper.

Collator 63 is configured to insert one or more sheets of paper between two sheets of paper. For example, collator 63 includes an arm or roller that pushes a sheet of paper between two other sheets of paper. The arm or roller is actuated by a collator motor that is electrically controlled based on a signal generated by finisher processor 60. Alternatively, collator 63 may have other mechanisms known in the art for inserting sheets of paper between two other sheets of paper.

Hole puncher 64 is configured to make a hole in sheets of paper. For example, hole puncher 64 includes a circular blade which, when pressed against paper, cuts a hole in the paper. The circular blade is actuated by a puncher motor that is electrically controlled based on a signal generated by finisher processor 60. Alternatively, hole puncher 64 may have other mechanisms known in the art for cutting a hole in the paper.

Folding assembly 65 is configured to fold paper. For example, folding assembly 65 includes a paper guide, two rollers, and a fold blade. The fold blade is centered between the two rollers at a location below the rollers. The paper guide conveys a sheet of paper next to the fold blade, and then the fold blade pushes a central part of the paper into a nip area between the two rollers. The rollers rotate to pull the central part of the paper into the nip area. The nip area applies pressure to produce a fold at the central part of the paper. The rollers and fold blade are actuated by various motors that are electrically controlled based on signals generated by finisher processor 60. Alternatively, folding assembly 65 may have other mechanisms known in the art for folding paper.

Finisher paper conveyor 66 includes rollers, belts, and mechanical guides that obtain sheets of paper from the appropriate finisher trays and conveys the sheets to any of stapler 62, collator 63, hole puncher 64, and folding assembly 65. The rollers, belts, and mechanical guides are actuated by various motors that are electrically controlled based on signals generated by finisher processor 60. The finisher trays contain stacks of printed sheets of paper from one or more printers 18. The stacks of printed sheets of paper may be transferred manually by a user from printers 18 to the finisher trays. Each stack may have a top sheet having a machine readable code, such as a bar code, that associates the stack with a particular print job. Each finisher tray may include an optical scanner, such as a bar code reader, that reads the machine readable code. Based on information from the optical scanner, finisher processor 60 determines the appropriate finisher tray from which to obtain a sheet of paper and determines an appropriate destination according to print job 17 received by finisher 20. The appropriate destination can be any of stapler 62, collator 63, hole puncher 64, and folding assembly 65. For example, finisher paper conveyor 66 may transport sheets of paper from collator 63 and then to stapler 62.

Some finishers 20 may have additional capabilities, such as stitching, while other finishers 20 may have fewer capabilities. For example, one finisher 20A may be limited to collating, while another finisher 20B may be limited to stapling. Thus, a stack of collated sheets of paper from finisher 20A may be transferred manually by a user to finisher 20B.

Finisher network interface (I/F) 67 is configured to allow finisher 20 to communicate with server 14 through network 22. Finisher network I/F 67 includes circuits and electronic components configured for data communication through network 22. Finisher network I/F 67 enables finisher 20 to receive print jobs 17 from server 14. Each print job to a finisher includes a job ticket that defines print process requirements relevant to that particular finisher. Unlike printer 18, finisher 20 does not have print assembly 53.

Figure 6:
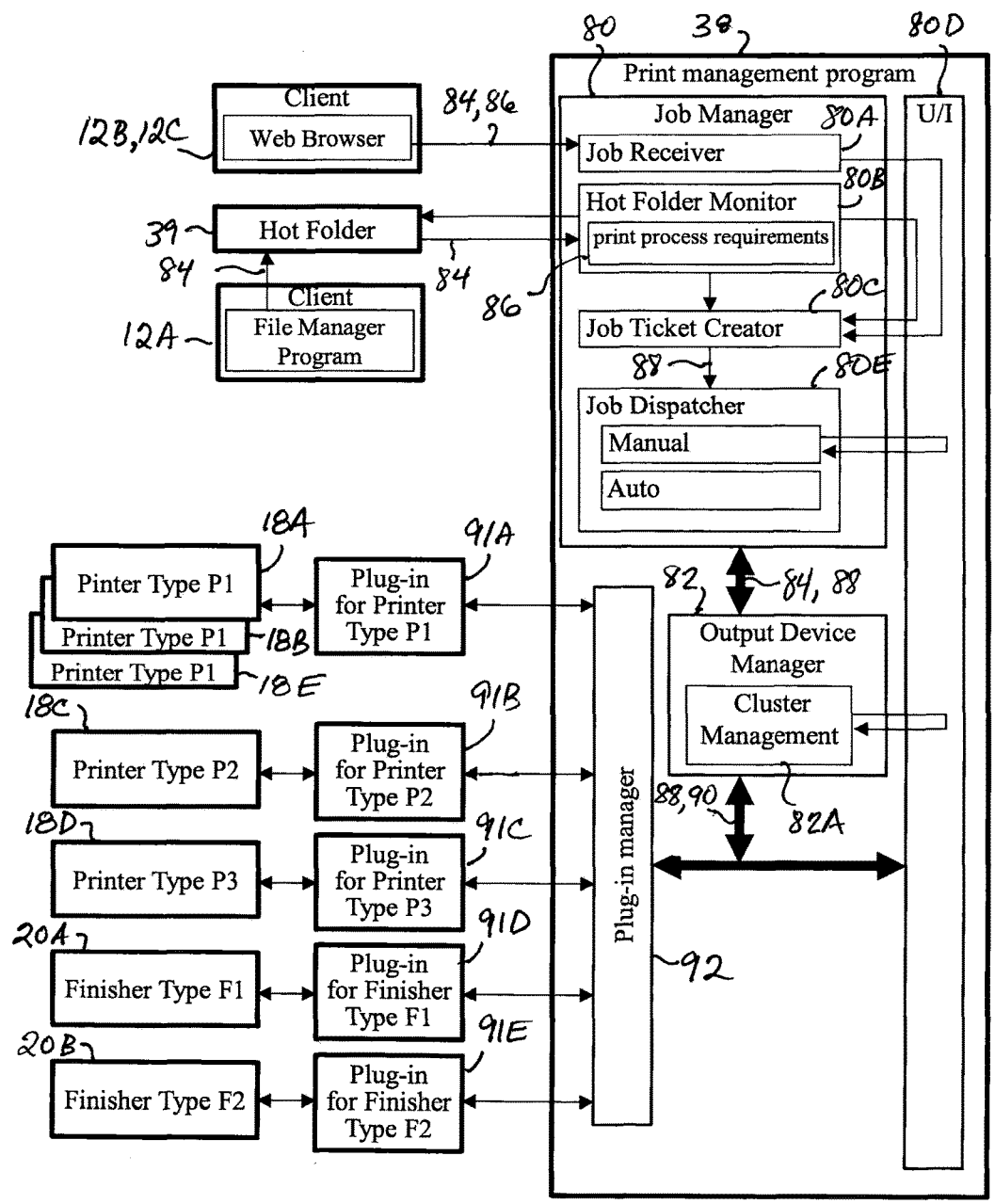
FIG. 6 is a schematic block diagram showing example functional modules of a print management program and example plug-ins mounted in the print server of FIG. 1.

As shown in FIG. 6, print management program 39 includes job manager software module 80 and output device manager software module 82. The term "output device" refers to printers 18 and finishers 20.

Job manager software module (abbreviated as job manager) 80 processes print orders 16 from client devices 12. Functional submodules 80A-80E of job manager 80 are described below.

Print orders 16 (FIG. 1) from client devices 12B and 12C include printing source file 84 and a corresponding data set of print process requirements 86. Such print orders are processed by job receiver submodule 80A. Print orders 16 from client device 12A includes printing source file 84 placed in one of hot folders 39 (FIG. 2) managed by server 14. As previously mentioned, each hot folder 39 has associated with it a data set of print process requirements 86. Hot folder monitor submodule 80B monitors hot folders 39 for any newly deposited printing source file 84. Hot folder monitor submodule 80B associates any newly deposited printing source file 84 with a corresponding data set of print process requirements 86 previously stored in server memory 31.

As previously mentioned, the data set of print process requirements 86 is not in a format that can be understood and used by printers 18 and finishers 20. Job ticket creator submodule 80C creates job ticket 88 based on the data set of print process requirements 86 for print order 16. Job ticket 88 is in a format, such as JDF or other XML-based format, that can be understood and used by the selected output device. JDF refers to Job Definition Format, which is an industry standard for exchanging information in the graphics industry. Job ticket 88 may be created with some user input via user interface (U/I) submodule 80D. User interface submodule 80D receives input from the user through server input device 34 and displays information to the user on server display 35.

Job dispatcher submodule 80E dispatches or assigns print order 16 to one or more output devices 18, 20. Job dispatcher submodule 80E analyzes job ticket 88 to determine whether print order 16 is to be split among plural output devices 18, 20. If job ticket 88 includes a parameter value that allows group processing, job dispatcher submodule 80E will assign print order 16 to multiple printers 18, or to at least one printer 18 and at least one finisher 20. If job ticket 88 includes a parameter value that prohibits cluster printing, job dispatcher submodule 80E will assign print order 16 to a single printer and no other printer.

Assignment of print order 16 may include some user input via U/I 80D and server input device 34 to select output devices having capabilities that match the print process requirements defined in job ticket 88. Alternatively or additionally, assignment of print order 16 may include server 14 analyzing job ticket 88 to select output devices having capabilities that match the print process requirements defined in job ticket 88. A match occurs when an output device is capable of each of the individual print process requirements.

Output device manager software module (abbreviated output device manager) 82 handles communications with output devices 18, 20. Output device manager 82 includes cluster management submodule 82A that creates print jobs 17 corresponding to print orders 16. Each print job 17 for printer 18 includes printing language file 90 that is in a language recognized and usable by the printer to allow printing of images defined in printing source file 84 of print order 16. Example printing languages include PostScript (R), Printer Control Language, Portable Document Format (PDF), and XML Paper Specification (XPS). For example, printing source file 84 may be in bitmap format (.BMP file), and printer 18 recognizes PostScript but not bitmap. Cluster management submodule 82A creates print job 17 including printing language file 90 in PostScript.

If job dispatcher 80E has assigned print order 16 to multiple output devices 18, 20, cluster management submodule 82A splits print order 16 into multiple print jobs, referred to as child jobs 17. Each child job can have its own printing language file 90.

For example, print order 16 may be split into first, second, and third child jobs. First child job 17 may be a print job for printing color pages defined in first printing language file 90, and the first printing language file 90 is sent by cluster management submodule 82A to a color printer. First printing language file 90 does not define any BW pages. Second child job 17 may be a print job for printing BW pages defined in second printing language file 90, and second printing language file 90 is sent by cluster management submodule 82A to a black-and-white only (BW) printer. Second printing language file 90 does not define any color pages. Third child job 17 may be a finishing job for collating printed color pages obtained from the color printer into BW pages obtained from the BW printer, and the third child job is sent by cluster management submodule 82A to a collating finisher. Collating is performed according to job ticket 88.

Referring again to FIG. 6, various software plug-ins 91 are installed in server 14. Plug-ins 91 are mounted on print management program 38 to handle communications between server 14 and output devices 18, 20.

For example, there can be three types of printers 18 according to Table I, and two types of finishers according to Table II.

TABLE I

| Printer Types | Capability |
| --- | --- |
| Type P1 | 2-sided *; BW-only |
| Type P2 | 2-sided *; color ** |
| Type P3 | 1-sided only; BW-only |

* Printers capable of 2-sided printing are capable of 1-sided printing.
** Printers capable of color printing are capable of BW printing.

TABLE II

| Finisher Types | Capability |
| --- | --- |
| Type F1 | collating only |
| Type F2 | binding: stapling and stitching |

Plug-in 91A works only with type P1 printers, which are printers 18A, 18B, and 18E. For example, printers 18A and 18B may have 2-sided, BW-only printing capability on letter size sheets only, while printer 18E may have 2-sided, BW-only printing capability on letter and tabloid size sheets. Plug-in 91B works only with type P2 printers, which corresponds only to printer 18C having 2-sided, color printing capability on letter and tabloid size sheets. Plug-in 91C works only with type P3 printers, which corresponds only to printer 18D having single-sided, BW-only printing on letter and tabloid size sheets. The printer capabilities in this example are summarized in Table III. Job dispatcher 80E may use a lookup table similar to Table III stored in server memory 31 to select one or more printers 18 to complete print order 16.

TABLE III

| Printer | Type | Capability |
|---|---|---|
| 18A | P1 | 2-sided, BW-only, letter size only |
| 18B | P1 | 2-sided *, BW-only, letter size only, booklet printing |
| 18C | P2 | 2-sided *, color **, letter and tabloid sizes, stapling |
| 18D | P3 | 1-sided only, BW-only, letter and tabloid sizes |
| 18E | P1 | 2-sided *, BW-only, letter and tabloid sizes |

\* Printers capable of 2-sided printing are capable of 1-sided printing.
\*\* Printers capable of color printing are capable of BW printing.

Plug-in 91D works with all type F1 finishers, which corresponds only to finisher 20A in this example. Plug-in 91E works with all type F2 finishers, which corresponds only to finisher 20B in this example. The finisher capabilities in this example are summarized in Table IV. Job dispatcher 80E may use a lookup table similar to Table IV stored in server memory 31 to select one or more finishers 20 to complete print order 16.

TABLE IV

| Finisher | Type | Capability |
|---|---|---|
| 20A | F1 | collating only, letter and tabloid size |
| 20B | F2 | stapling, stitching, letter and tabloid size |

Plug-in manager 92 is a software module of print management program 38. Plug-in manager 92 analyzes all plug-ins 91 to determine what type of plug-ins have been mounted. In FIG. 6, plug-in manager 92 determines that plug-ins for printer types P1, P2, and P3 are available, and that plug-ins for finisher types F1 and F2 are available. If FIG. 6 is modified by removing plug-in 91A, plug-in manager 92 will determine that no plug-in for printer type P1 is available. Plug-in manager 92 may maintain a listing of the plug-ins that are available, and the listing is accessed plug-in manager 92 whenever a print order is received by server 14.

The plug-ins are not essential parts of print management program 38, which includes job manager module 80, output device manager module 82, and plug-in manager module 92. Each of modules 80, 82, and 92 can continue to function as previously described after removal of any one of plug-ins 91.

Figure 7:
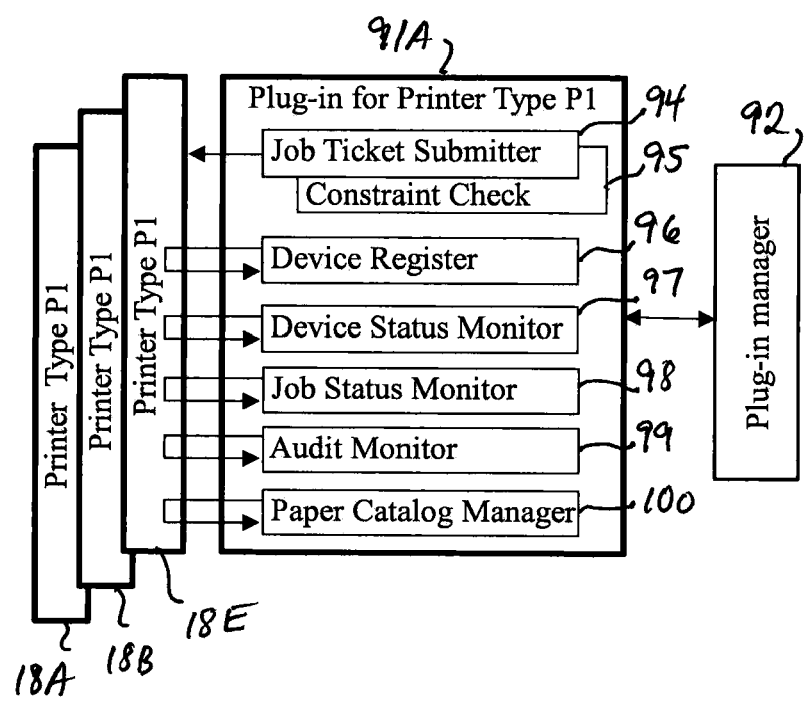
FIG. 7 is a schematic block diagram showing example functional modules of the plug-ins of FIG. 6.

Referring to FIG. 7, functional submodules 94-100 of plug-in 91A will be described below. All other plug-ins 91B-E have the same functional submodules 94-100.

Job ticket submitter submodule 94 sends job ticket 88 to the selected output device. For example, printer 18E has 2-sided only, BW-only printing capability on letter and tabloid size sheets as shown in Table III. If job ticket 88 from job ticket creator 80C (FIG. 6) specifies 1-sided, BW printing on tabloid size sheets, job dispatcher 80E may select printer 18E, and then job ticket submitter submodule 94 of plug-in 91A sends job ticket 88 to printer 18E. Plug-in 91A would also send printing language file 90 to printer 18E. Printing language file 90 defines the content to be printed, and job ticket 88 defines the requirements (2-sided, BW printing on tabloid size sheets) for printing the content. For example, the content could be a photograph, illustration, text, or a combination thereof.

Constraint check submodule 95 enables the selected output device to confirm that it supports all print process requirements in job ticket 88. Continuing from the previous example, printer 18E is capable of printing on tabloid size paper, but tabloid size paper may be currently unavailable in printer 18E, so the constraint is communicated to job dispatcher submodule 80E.

Job dispatcher submodule 80E (FIG. 6) performs a printer constraint resolution process. For example, job dispatcher submodule 80E may try to find another printer capable of 1-sided, BW printing on tabloid size paper. As shown in Table III, printer 18C is capable of 2-sided color printing on tabloid size paper, which means that it is also capable of printing on a single side (1-sided printing) using black only (BW printing). To resolve the constraint, job dispatcher submodule 80E may autonomously change the selection from printer 18E to printer 18C, or it may allow the server-side user to confirm the change via U/I 80D.

In a further example, job ticket 88 may require finishing that includes both stapling and stitching, so finisher 20B is selected by cluster management submodule 82A based on Table IV, which shows that finisher 20B can staple and stitch on tabloid size paper. However, finisher 20B is incapable for performing both stapling and stitching on the sheets of paper, so the constraint is communicated to dispatcher submodule 80E.

Job dispatcher submodule 80E performs a finisher constraint resolution process. For example, job dispatcher 80E may allow the server-side user to waive or remove one of the binding requirements via U/I 80D. If the user removes the stapling requirement, the constraint is resolved, and the print job will proceed with finisher 20B performing stitching only.

Referring again to FIG. 7, device register submodule 96 obtains identifying information from all output devices 18, 20 connected to server 14. Identifying information, such as a machine name and/or machine location are displayed by U/I 80D on server display 35 (FIG. 2). Device status submodule 97 polls all output devices 18, 20 to obtain device status information from each output device. Examples of device status information include offline, busy, idle, and paper jam. Device status information is communicated to job dispatcher submodule 80E, which uses the job status information to determine which output devices 18, 20 will be assigned to print orders 16.

Job status monitor submodule 98 receives job status indicator about print job 17 that was sent to output devices 18, 20. Example job status indictors include waiting, in progress, completed, and error. Each output device sends a status indicator that is displayed by U/I 80D on server display 35 (FIG. 2).

Audit monitor submodule 99 receives and analyzes audit information from output devices 18, 20, converts the audit information to readable data that is recognizable by print management program 38, and transmits the readable data to print management program 38. The audit information from printer 18 includes information on a number of pages printed relative to a printer tray and paper sheet size. For example, the audit information may specify that letter size paper from printer tray 1 was used for 205 pages. The audit information from finisher 20 includes information on a number of pages subjected to a finishing operation.

Paper catalog manager submodule 100 receives a paper catalog from each printer 18 and transmits the paper catalog to print management program 38. Each printer 18 has a function for storing paper-related settings associated with a printer tray. Paper-related settings are a group of paper parameters, such as paper size, color, weight, and material type. Each paper-related setting (group of paper parameters) is given a catalog name in a paper catalog. Since the paper catalog (a group of catalog names) is transmitted by paper catalog manager submodule 100 to print management program 38, a client-side user may assign one or more catalog names to print order 16. Advantageously, the client-side user does not have to specify paper parameters individually for print order 16. Print management program 38 recognizes the catalog names in print order 16 and assigns the appropriate printer or printers to complete printer order 16. The selected printer or printers are those that have printer trays that correspond to the catalog names in print order 16. Paper catalog manager submodule 100 is an interface for communicating with printer 18 to obtain information about paper-related settings associated with printer trays, analyzing said information and then converting it into data (a paper catalog) that is recognizable by print management program 18.

There are several advantages to having submodules 94-101 in plug-ins instead of in print management program 38. First, each output device model (e.g. Accurio Press C6100, C1100, Accurio Pro 1250, etc.) typically has slightly different specifications for color support, paper size, print speed, supported finishing options, and so on. As such, print job settings that are possible will differ among output devices. In addition, each printer typically supports multiple controllers that are developed by different companies (e.g., KonicaMinolta, EFI, and Creo), and each controller provides different protocols that are not compatible with those of other controllers. Having submodules 94-101 in plug-ins allow for efficient handling of different device specifications and controller protocols. In particular, advantages of having submodules 94-100 and optionally 101 in plug-ins include: (a) the ability to support a new device model by adding a new plug-in rather than making changes throughout a relatively large software program, such as print management program 38; (b) allowing a customer or output device manufacturer to have installed in print server 14 a required plug-in which is owned or provided by the customer or output device manufacturer, which results in improved print server performance as the seek time to find an appropriate submodule for handling a print order is reduced; and (c) deployment and patch releases can be accomplished within the framework of a plug-in, which requires less software testing time.

Referring again to FIG. 6, each plug-in 91B-E handles communications between server 14 and only one of the output devices to complete a single print order 16. Each plug-in 91B-E does not handle communications with more than one output device for a single print order 16. For example, plug-in 91A handles communications between server 14 and either printer 18A, 18B, or 18E to complete a single print order 16.

Figure 8:
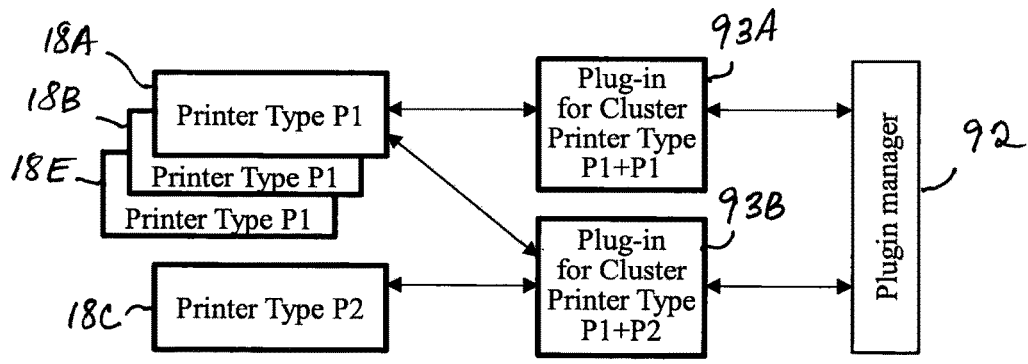
FIG. 8 is a schematic block diagram showing example group plug-ins mounted in the print server of FIG. 1, the group plug-ins being for cluster printers.
Figure 11:
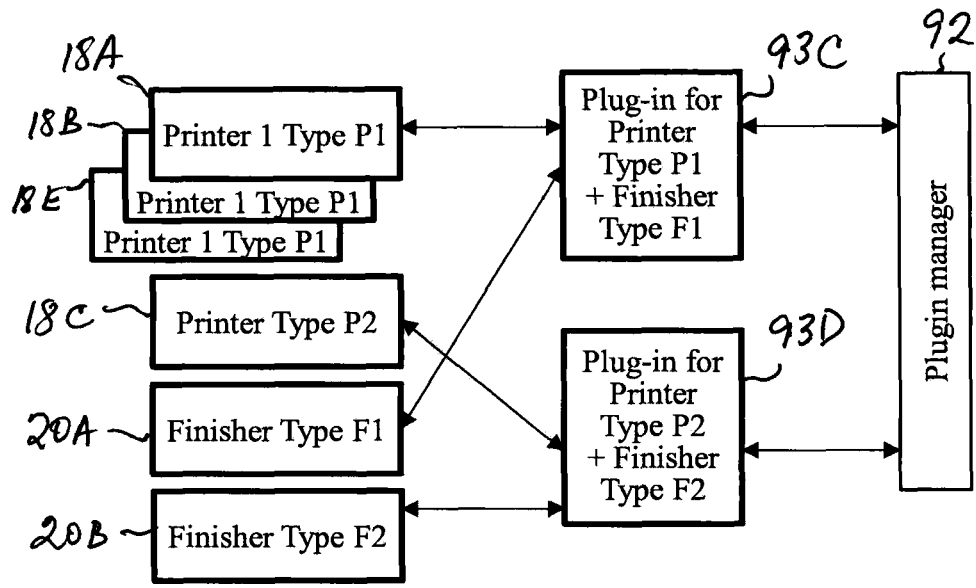
FIG. 11 is a schematic block diagram showing example group plug-ins mounted in the print server of FIG. 1, the group plug-ins being for printers and finishers.

FIG. 6 may be modified to include one or more group plug-ins. A group plug-in handles communications between server 14 and two or more output devices to complete a single print order 16. For example, a group plug-in may handle communication with two printers as shown in FIG. 8. As a further example, a group plug-in may handle communication with one printer and one finisher as shown in FIG. 11.

FIG. 8 shows group plug-ins 93A and 93B that can be added to FIG. 6. Group plug-ins 93A and 93B handle communication between server 14 and two printers to complete a single print order 16. Plug-in 93A handles communications to two type P1 printers to complete a single print order 16. For example, a single print order 16 may require 2-sided printing of thousands of BW letter size pages. Based on Table III, job dispatcher 80E may divide the pages between printers 18A and 18B. Some pages of print order 16 may be assigned to printer 18A, and the remaining pages of print order 16 may be assigned to printer 18B. Alternatively, if printer 18B is busy, job dispatcher 80E may assign to printer 18E instead.

Plug-in 93B handles communications between server 14 and two types of printers: type P1 and type P2. For example, a single print order may have BW pages and color pages. Based on Table III, job dispatcher 80E may assign the BW pages to printer 18A (type P1) and assign the color pages to printer 18C (type P2).

Figure 9:
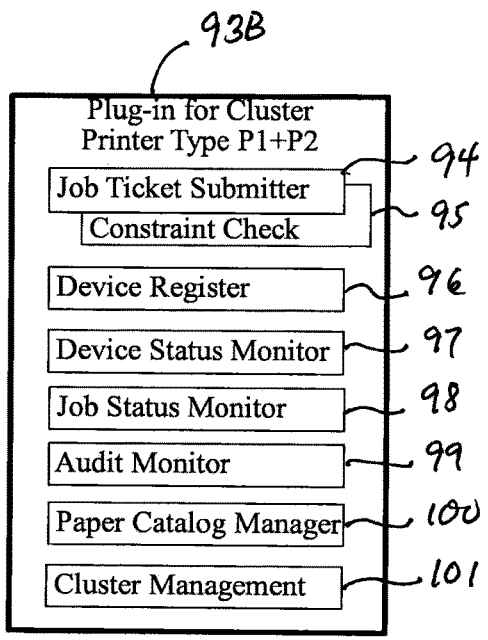
FIG. 9 is a schematic block diagram showing example functional modules of the plug-ins of FIG. 8.

FIG. 9 shows functional submodules 94-101 of group plug-in 93B. Group plug-in 93A has the same functional submodules as group plug-in 93B.

Submodules 94-100 function as described for plug-ins 91A-E. Cluster management submodule 101 splits print order 16 into multiple jobs, referred to as child jobs 17, if job dispatcher 80E in print management program 38 has assigned print order 16 to multiple printers 18.

Figure 10:
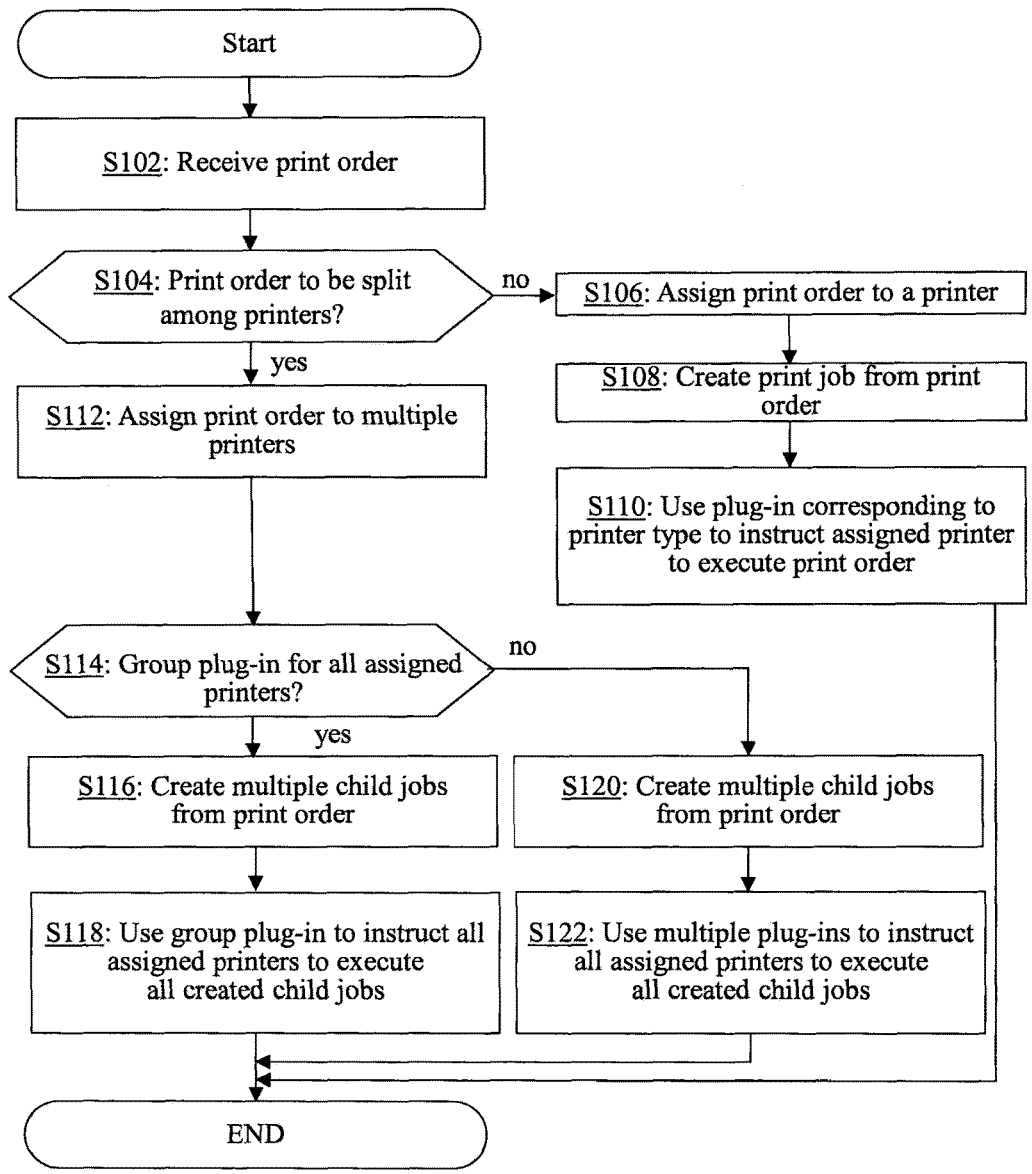
FIG. 10 is a flow diagram showing an example method for print management using the plug-ins of FIGS. 6 and 8.

FIG. 10 shows an example print management method that can be performed with system 10 of FIGS. 1-9 or by another system. At block S102, server 14 receives print order 16. At block S104, server 14 determines whether the received print order is to be split among plural output devices. The plural output devices includes a first device and a second device. For example, the first and second devices can be printers 18A and 18C.

The determination at block S104 can be made by job dispatcher 80E of print management program 38. Job dispatcher 80E analyzes job ticket 88 to determine whether print order 16 is to be split among plural output devices.

If job ticket 88 includes a parameter value that prohibits group processing (S104:NO), then at block S106 job dispatcher submodule 80E assigns print order 16 to a single printer. Job dispatcher 80E analyzes job ticket 88. If the print process requirements defined in job ticket 88 match capabilities of one of printers 18, then job dispatcher 80E assigns print order 16 to that printer. For example, if job ticket 88 includes a parameter value that prohibits group processing and the print process requirements defined in job ticket 88 match capabilities of printer 18C, then job dispatcher 80E assigns print order 16 to printer 18C and no other printer. Print order 16 may have BW and color pages, in which case printer 18C is instructed to print both the BW and color pages.

At block S108, device manager 82 creates a print job from print order 16. At block S110, print order 16 is completed by using plug-in 91 corresponding to the assigned printer to instruct the assigned printer to execute the print job. For example, if print order 16 was assigned to printer 18C at block S106, then print order 16 can be completed by using plug-in 91B (FIG. 6) to instruct printer 18C to execute the print job.

If job ticket 88 includes a parameter value that allows group processing (S104:YES), then at block S112 job dispatcher module 80E assigns print order 16 to multiple printers 18. Job dispatcher 80E analyzes job ticket 88. If the print process requirements defined in job ticket 88 match capabilities of the first and second devices, then job dispatcher 80E assigns the print order to the first and second devices. For example, if the print process requirements defined in job ticket 88 match capabilities of printers 18A and 18C, then job dispatcher 80E assigns the print order to printers 18A and 18C. The combination of printers 18A and 18C can be represented in print management program 38 as a virtual cluster printer with type P1 and P2 capabilities.

At block S114, plug-in manager 92 determines whether print server 14 has a group plug-in corresponding to both the first and second devices that were selected at block S112. For example, if printer 18A (type P1) and printer 18C (type P2) were selected at block S112, plug-in manager 92 determines whether print server 14 has group plug-in 93B (FIG.

8). Plug-in 93B can be referred to as a plug-in for a virtual cluster printer with type P1 and P2 capabilities.

When print server 14 is determined to have a group plug-in corresponding to both the first and second devices (S114:YES), then at block S116 cluster management module 101 of the group plug-in (not the cluster management submodule 82A of print management program 38) creates a first child job and a second child job from print order 16. At block S118, the print order is completed by using the group plug-in to instruct the first device to execute the first child job and to instruct the second device to execute the second child job. For example, if group plug-in 93B was found at block S114, group plug-in 93B is used to instruct printer 18A to execute the first child job for BW pages only and to instruct printer 18C to execute the second child job for color pages only.

When print server 14 is determined to not have a group plug-in corresponding to both the first and second devices (S114:NO), then at block S120 cluster management submodule 82A of print management program 38 (not cluster management module 101 of a group plug-in) creates a first child job and a second child job from print order 16. At block S122, print order 16 is completed by using a first plug-in (not a group plug-in) to instruct the first device to execute the first child job and a second plug-in (not a group plug-in) to instruct the second device to execute the second child job. The first and second plug-ins can be plug-ins corresponding to the printer type of the selected printers. For example, if group plug-in 93B was not found at block S114, plug-in 91A of FIG. 6 (an example of a first plug-in) is used to instruct printer 18A to execute the first child job for BW pages only, and plug-in 91B of FIG. 6 (an example of a second plug-in) is used to instruct printer 18C to execute the second child job for color pages only.

FIG. 11 shows group plug-ins 93C and 93D that can be added to FIG. 6 or FIG. 6 in combination with FIG. 8. Group plug-ins 93C and 93D handle communication between server 14 and a printer and a finisher. Plug-in 93C handles communications between server 14, a type P1 printer, and type F1 finisher. For example, a single print order 16 may require 2-sided BW letter size pages that are to be collated with colored paper. Based on Tables III and IV, job dispatcher 80E may divide the print order between printer 18A and finisher 20A.

Plug-in 93D handles communications between server 14, a type P2 printer, and type F2 finisher. For example, a single print order 16 may require 2-sided color tabloid size pages that are to be stapled. Based on Tables III and IV, job dispatcher 80E may divide the print order between printer 18C and finisher 20B.

Figure 12:
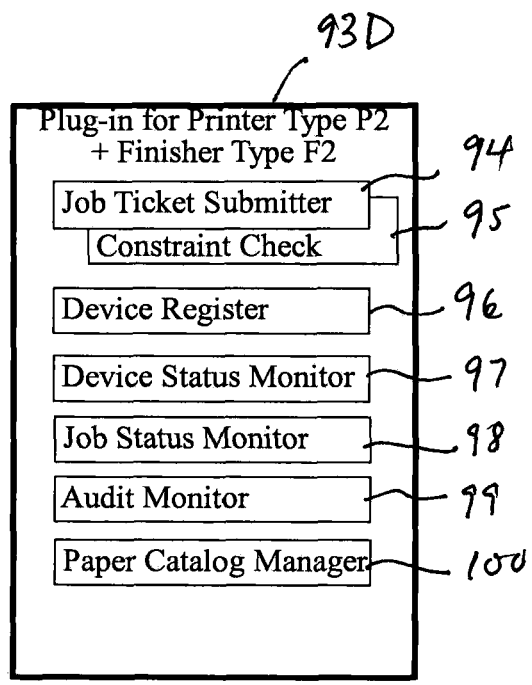
FIG. 12 is a schematic block diagram showing example functional modules of the plug-ins of FIG. 11.

FIG. 12 shows functional submodules 94-100 of group plug-in 93D. Group plug-in 93C has the same functional submodules as group plug-in 93B. Submodules 94-100 function as described for plug-ins 91A-E. Group plug-ins 93C and 93D do not include a cluster management module.

Figure 13:
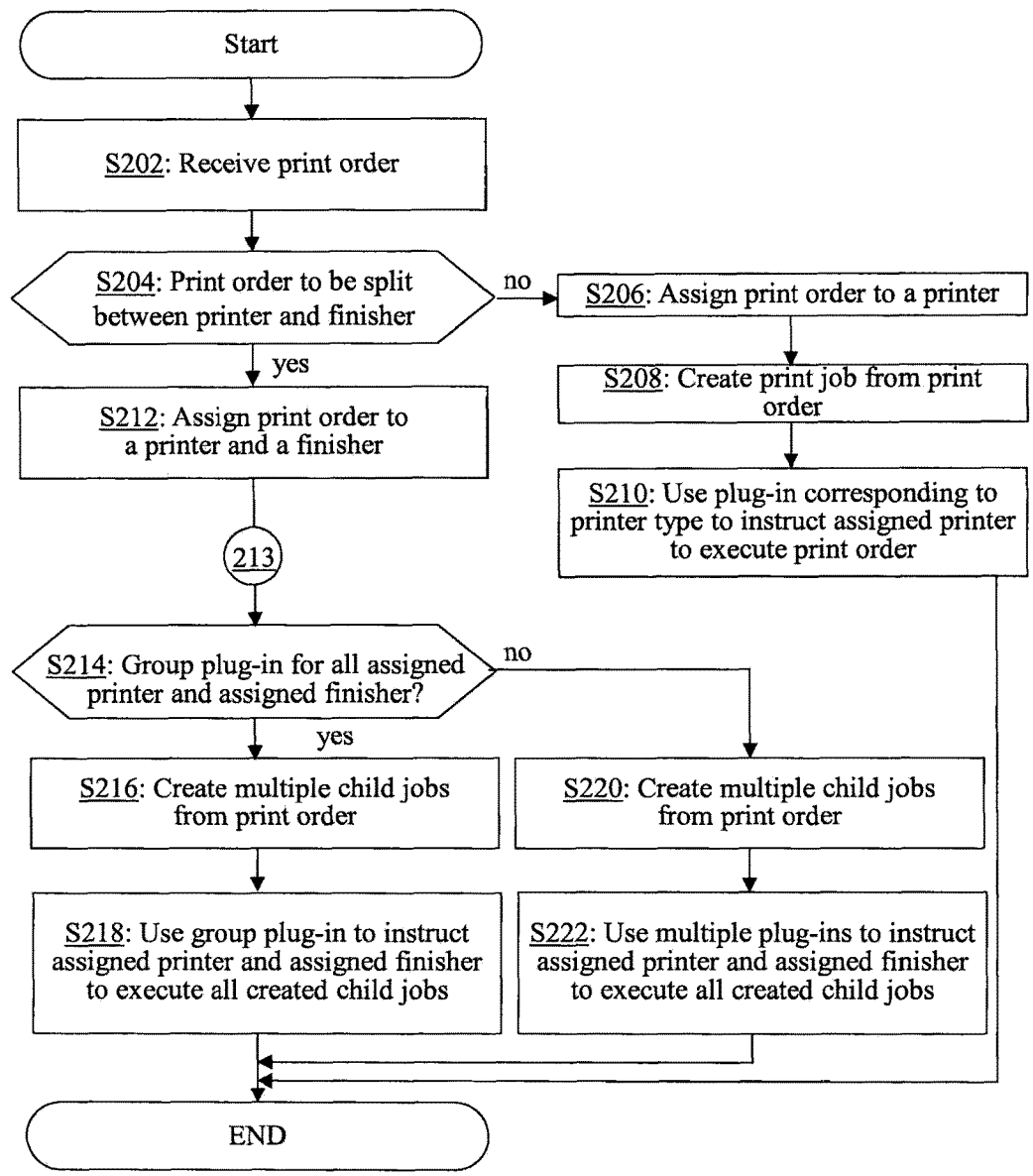
FIG. 13 is a flow diagram showing an example method for print management using the plug-ins of FIGS. 6 and 11.

FIG. 13 shows an example print management method that can be performed with system 10 of FIGS. 1-9, 11, and 12 or by another system. At block S202, server 14 receives print order 16. At block S204, server 14 determines whether the received print order is to be split among plural output devices. The plural output devices includes a first device and a second device. For example, the first and second devices can be printer 18C and finisher 20B.

The determination at block S204 can be made by job dispatcher 80E of print management program 38. Job dispatcher 80E analyzes job ticket 88 to determine whether print order 16 is to be split among plural output devices. For example, job ticket 88 may include parameter values that requires printing color pages and then stapling.

If job ticket 88 includes a parameter value that prohibits group processing (S204:NO), then at block S206 job dispatcher submodule 80E assigns print order 16 to a printer only. Print order 16 is not assigned to any finisher 20 which does not have any printing capability. Job dispatcher 80E analyzes job ticket 88. If the print process requirements defined in job ticket 88 match capabilities of one of printers 18, then job dispatcher 80E assigns print order 16 to that printer. For example, if job ticket 88 includes a parameter value that prohibits group processing and the print process requirements (printing color pages and then stapling) defined in job ticket 88 match capabilities of printer 18C in a lookup table, then job dispatcher 80E may assign print order 16 to printer 18C. Printer 18C will print pages and then staple them.

At block S208, device manager 82 creates a print job from print order 16. At block S210, print order 16 is completed by using plug-in 91 corresponding to the assigned printer to instruct the assigned printer to execute the print job. For example, if print order 16 was assigned to printer 18C at block S206, then print order 16 can be completed by using plug-in 91B (FIG. 6) to instruct printer 18C to execute the print job.

If job ticket 88 includes a parameter value that allows group processing (S204:YES), then at block S212 job dispatcher module 80E assigns print order 16 to multiple output devices 18, 20. Job dispatcher 80E analyzes job ticket 88. If the print process requirements defined in job ticket 88 match capabilities of the first and second devices, then job dispatcher 80E assigns the print order to the first and second devices. For example, if the print process requirements (printing color pages and then stapling) defined in job ticket 88 match capabilities of printer 18C (color pages) and finisher 20B (stapling) in a lookup table, then job dispatcher 80E assigns the print order to printer 18C and finisher 20B.

At block S214, plug-in manager 92 determines whether print server 14 has a group plug-in corresponding to both the first and second devices that were selected at block S212. For example, if printer 18C (type P2) and finisher 20B (type F2) were selected at block S212, plug-in manager 92 determines whether print server 14 has group plug-in 93D (FIG. 11).

When print server 14 is determined to have a group plug-in corresponding to both the first and second devices (S214:YES), then at block S216 a first child job and a second child job are created from print order 16. For example, a first child job would have a first job ticket defining a set of print process requirements (e.g., color printing, no stapling) relevant to printer 18C. A second child job would have a second job ticket defining a set of print process requirements (e.g., stapling) relevant to finisher 20B.

At block S218, the print order is completed by using the group plug-in to instruct the first device to execute the first child job and to instruct the second device to execute the second child job. For example, if group plug-in 93D was found at block S214, the print order is completed by using group plug-in 93D to instruct printer 18C to execute the first child job for printing and to instruct finisher 20B to execute the second child job for stapling.

When print server 14 is determined to not have a group plug-in corresponding to both the first and second devices (S214:NO), then at block S220 a first child job and a second child job are created from print order 16. At block S222, print order 16 is completed by using a first plug-in (not a group plug-in) to instruct the first device to execute the first child job and a second plug-in (not a group plug-in) to instruct the second device to execute the second child job. The first plug-in can be a plug-in corresponding to the printer type of the selected printer. The second plug-in can be a plug-in corresponding to the finisher type of the selected finisher. For example, if group plug-in 93B was not found at block S214, plug-in 91B of FIG. 6 (an example of a first plug-in) is used to instruct printer 18C to execute the first child job for printing, and plug-in 91E of FIG. 6 (an example of a second plug-in) is used to instruct finisher 20B to execute the second child job for stapling.

Group plug-in 93D provides certain advantages over generic plug-ins 91B and 91E. The group plug-in can reduce costs associated with plug-in loading time and job splitting time. With regard to plug-in loading time, if there is no group plug-in present, then print management program 38 has to load two or more plug-ins to complete print order 16. The associated cost for an individual print order is small, but the costs multiply in high volume printing operations. The cost can be significant in a print shop that handles a thousand or more print orders. With regard to job splitting time, as discussed for block S114 in FIG. 10, print management program 38 will first try to figure out if an appropriate group plug-in is present. If not, then print management program 38 returns from plug-in manager 92 to cluster manager 82A (S120 in FIG. 10) to split the job. This increases costs particularly when there are a large number of print orders.

In FIG. 13, the child jobs are created by the group plug-in at block S216 or S220 after block S214. Alternatively, the child jobs may be created at point 213 by print management program 83. For example, cluster management submodule 82A of print management program 83 may create child jobs at point 213.

Figure 14:
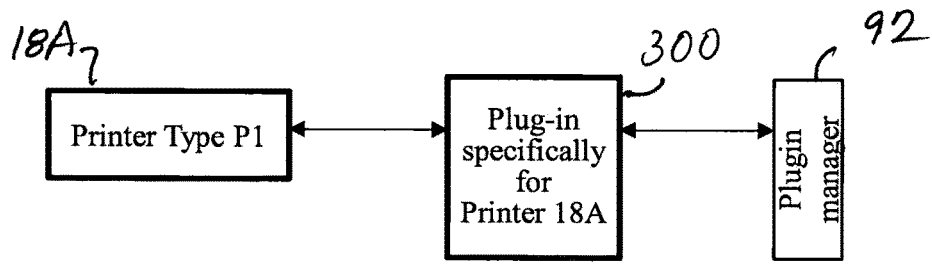
FIG. 14 is a schematic block diagram showing an example printer-specific plug-in mounted in the print server of FIG. 1.

FIG. 14 shows printer-specific plug-in 300 that can be added to FIG. 6 alone or in combination with FIG. 8 and/or FIG. 11.

Figure 15:
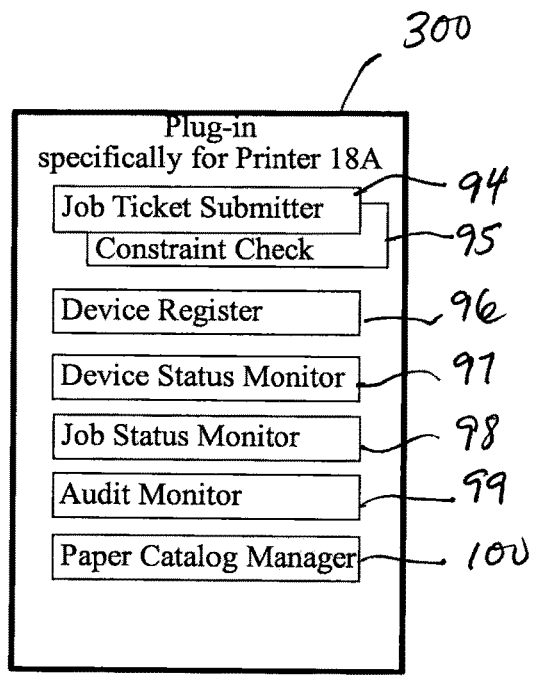
FIG. 15 is a schematic block diagram showing example functional modules of the plug-in of FIG. 14.

FIG. 15 shows functional submodules 94-100 of printer-specific plug-in 300.

Submodules 94-100 function as described for plug-ins 91A-E. Printer-specific plug-in 300 does not include a cluster management module. Optionally, printer-specific plug-in 300 does not communicate with more than one printer for a single print order.

Figure 16:
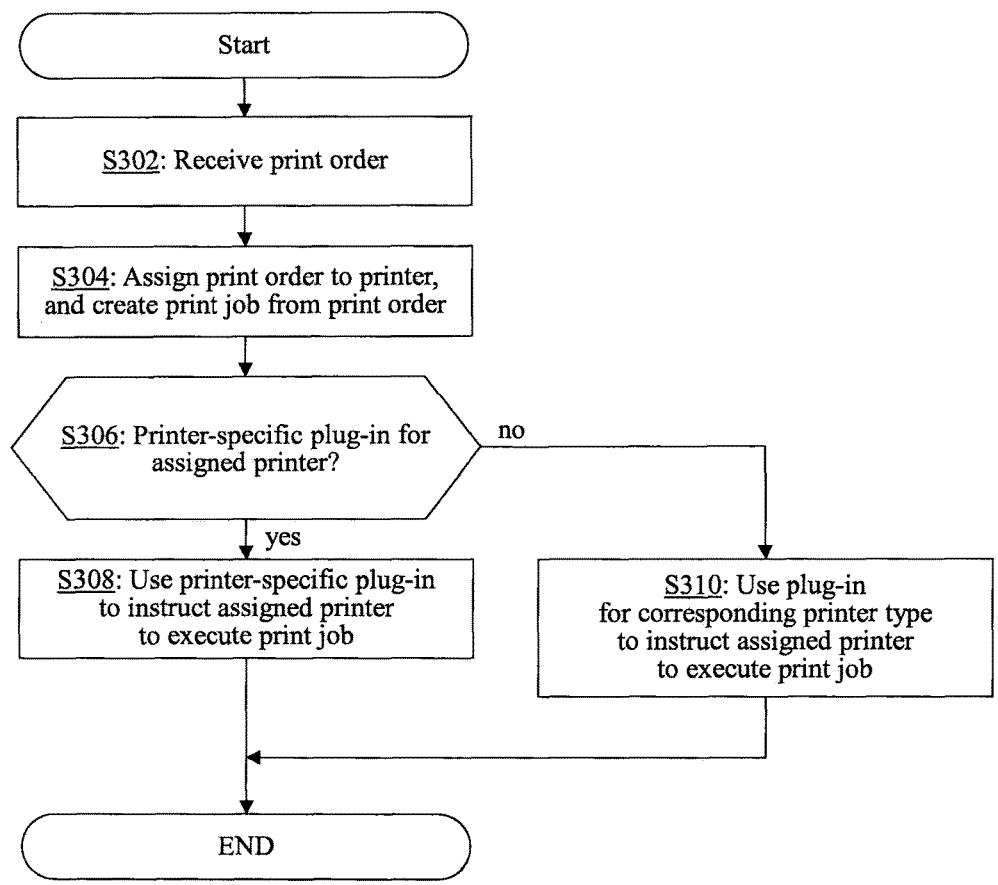
FIG. 16 is a flow diagram showing an example method for print management using the plug-ins of FIGS. 6 and 14.

FIG. 16 shows an example print management method that can be performed with system 10 of FIGS. 1-9, 11, and 12 or by another system. At block S302, server 14 receives print order 16. At block S304, job dispatcher submodule 80E assigns print order 16 to a printer. Job dispatcher 80E analyzes job ticket 88 as part of the assignment process. If group processing is prohibited and the print process requirements defined in job ticket 88 match capabilities of one of printers 18, then job dispatcher 80E assigns print order 16 to that printer. For example, if job ticket 88 prohibits group processing and includes print process requirements (printing color pages) defined in job ticket 88 that match capabilities of printer 18C in a lookup table, then job dispatcher 80E may assign print order 16 to printer 18C. Also at block S304, device manager 82 creates a print job from print order 16.

At block S306, plug-in manager 92 determines whether print server 14 has a printer-specific plug-in corresponding to the printer selected at block S304. For example, if printer 18C was selected at block S304, plug-in manager 92 determines whether print server 14 has printer-specific plug-in 300 (FIG. 14).

When print server 14 is determined to have a printer-specific plug-in corresponding to the selected printer (S306: YES), then at block S308 the print order is completed by using the printer-specific plug-in to instruct the selected printer to execute the print job. For example, if printer-specific plug-in 300 was found at block S306, the print order is completed by using printer-specific plug-in 300 to instruct printer 18C to execute the print job.

When print server 14 is determined to not have a printer-specific plug-in corresponding to the selected printer (S314: NO), then at block S310 the print order is completed by using a first plug-in (not a printer-specific plug-in) to instruct the selected printer to execute the print job. The first plug-in can be a plug-in corresponding to the printer type of the selected printer. For example, if printer-specific plug-in 300 was not found at block S314, plug-in 91B of FIG. 6 (an example of a first plug-in) is used to instruct printer 18C to execute the print job.

Use of printer-specific plug-in 300 can have advantages over plug-in 91B, which is generic to type 2 printers. Printer-specific plug-in 300 can be optimized to the configuration of a particular printer so as to reduce the amount of time to generate a job ticket, such as a job ticket in JDF format.

For example, a printer may be capable of stapling but not capable of any other finishing operation. A printer-specific plug-in for that printer will specify a stapling option in the job ticket. The stapling option determines whether or not stapling is to be performed. If stapling is to be performed, the stapling option will specify how it be performed, such as a stapling on the top left corner of the paper. When creating the job ticket, the printer-specific plug-in will skip or omit options for any other finishing operation since only stapling applies to the printer. The job ticket is not have options for any finishing operation except for stapling. This increases efficiency in creating job tickets compared to generic plug-in 91B. If a printer-specific plug-in is not available for the printer and generic plug-in 91B is used, the generic plug-in 91B may have to specify options for all finishing operations that apply to type P2 printers.

Figure 17:
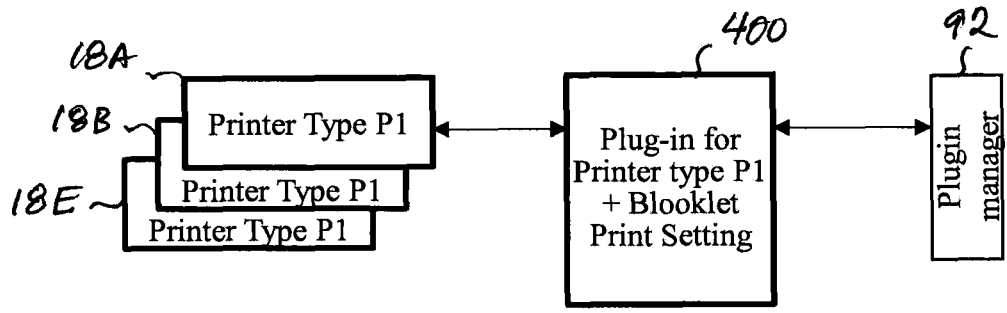
FIG. 17 is a schematic block diagram showing an example setting-specific plug-in mounted in the print server of FIG. 1.

FIG. 17 shows setting-specific plug-in 400 that can be added to FIG. 6 alone or in combination with FIG. 8, FIG. 11, and/or FIG. 14.

Figure 18:
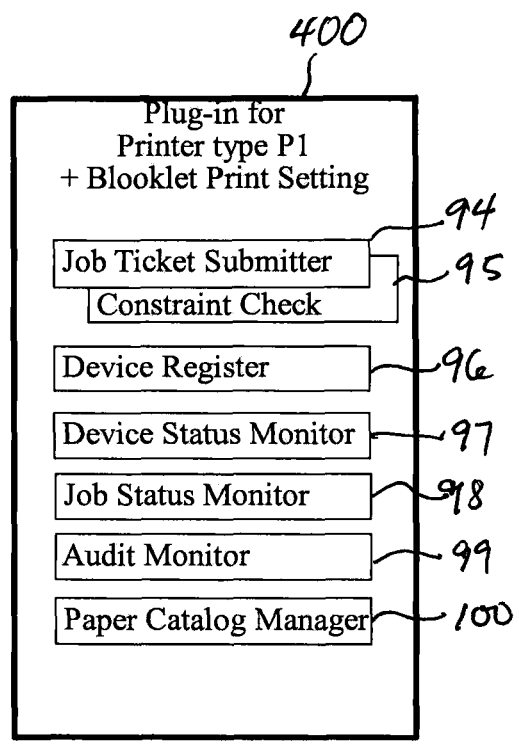
FIG. 18 is a schematic block diagram showing example functional modules of the plug-in of FIG. 17.

FIG. 18 shows functional submodules 94-100 of setting-specific plug-in 400. Submodules 94-100 function as described for plug-ins 91A-E. Setting-specific plug-in 400 does not include a cluster management module. Optionally, setting-specific plug-in 300 does not communicate with more than one printer for a single print order.

Figure 19:
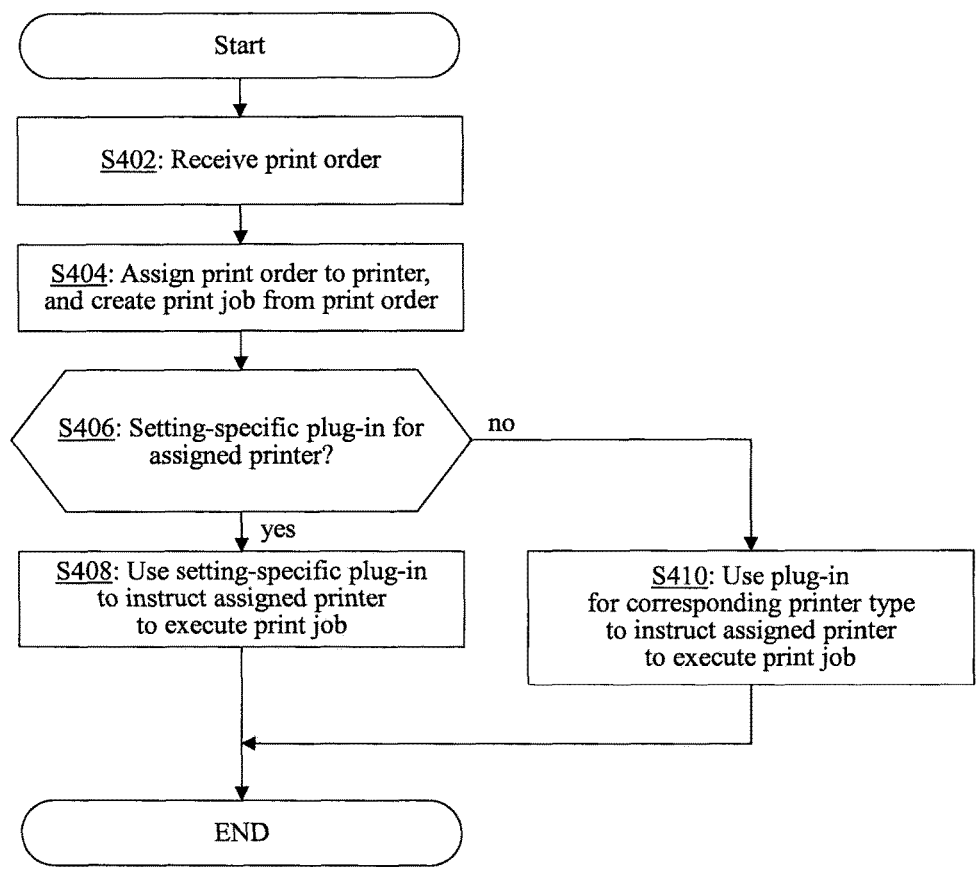
FIG. 19 is a flow diagram showing an example method for print management using the plug-ins of FIGS. 6 and 17.

FIG. 19 shows an example print management method that can be performed with system 10 of FIGS. 1-9, 11, 12, 14 and 15 or by another system. At block S402, server 14 receives print order 16. At block S404, job dispatcher submodule 80E assigns print order 16 to a printer. Job dispatcher 80E analyzes job ticket 88 as part of the assignment process. If the print process requirements defined in job ticket 88 match capabilities of one of printers 18, then job dispatcher 80E assigns print order 16 to that printer. For example, if the print process requirements (booklet print setting) defined in job ticket 88 match capabilities of printer 18B in a lookup table, then job dispatcher 80E may assign print order 16 to printer 18B. Booklet print setting involves printing two pages of a document on a single sheet of paper. Also at block S404, device manager 82 creates a print job from print order 16.

At block S406, plug-in manager 92 determines whether print server 14 has a setting-specific plug-in corresponding to the print setting and the printer selected at block S404. For example, if printer 18B (type P1) was selected at block S404, plug-in manager 92 determines whether print server 14 has setting-specific plug-in 400 (FIG. 14) for booklet printing on type P1 printers.

When print server 14 is determined to have the corresponding setting-specific plug-in (S406:YES), then at block S408 the print order is completed by using the setting-specific plug-in to instruct the selected printer to execute the print job. For example, if setting-specific plug-in 400 was found at block S406, the print order is completed by using setting-specific plug-in 400 to instruct printer 18B to execute the print job.

When print server 14 is determined to not have the corresponding setting-specific plug-in (S414:NO), then at block S410 the print order is completed by using a first plug-in (not a setting-specific plug-in) to instruct the selected printer to execute the print job. The first plug-in can be a plug-in corresponding to the printer type of the selected printer. For example, if setting-specific plug-in 400 was not found at block S414, plug-in 91A of FIG. 6 (an example of a first plug-in) is used to instruct printer 18B to execute the print job.

Use of setting-specific plug-in 400 can have advantages over plug-in 91B, which is generic to type 2 printers, by increasing efficiency in creating a job ticket. For example, type P1 printers are assumed to have multiple finishing capabilities, such as stapling, folding, and others. Further, type P1 printers may have multiple folding capabilities, including booklet folding, letter folding, z-folding, and others. If the particular print shop only produces booklet printing products or produces mostly booklet printing products, a setting-specific plug-in for printer type P1 with booklet print setting may create a JDF job ticket by skipping or omitting options for all finishing operations except for folding. Furthermore, the setting-specific plug-in may omit options for all folding operations except for booklet folding. That is, the JDF job ticket does not include options for any finishing operation except for booklet folding.

Figure 20:
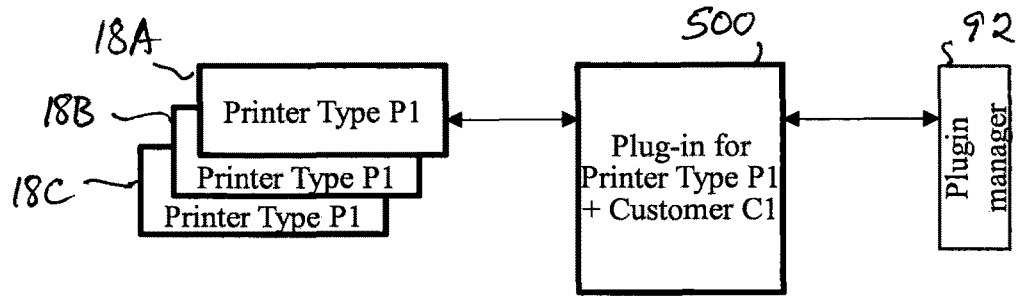
FIG. 20 is a schematic block diagram showing an example customer-specific plug-in mounted in the print server of FIG. 1.

FIG. 20 shows customer-specific plug-in 55 that can be added to FIG. 6 alone or in combination with FIGS. 8, 11, 14, and/or 17.

Figure 21:
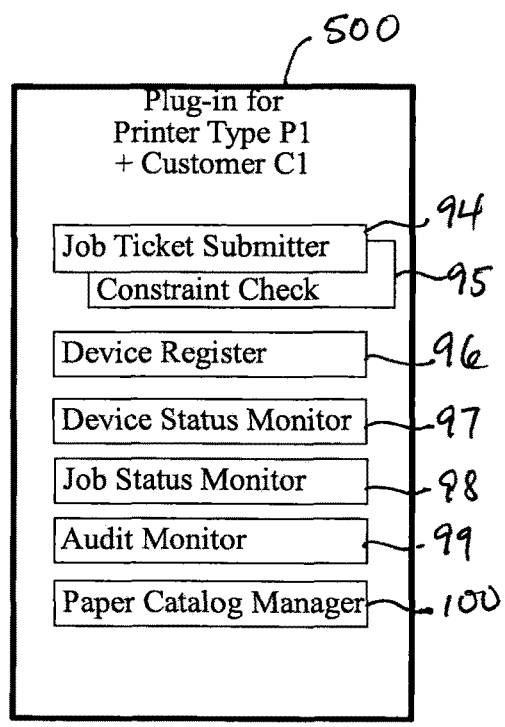
FIG. 21 is a schematic block diagram showing example functional modules of the plug-in of FIG. 20.

FIG. 21 shows functional submodules 94-100 of customer-specific plug-in 500. Submodules 94-100 function as described for plug-ins 91A-E. Customer-specific plug-in 500 does not include a cluster management module. Optionally, customer-specific plug-in 300 does not communicate with more than one printer for a single print order.

Figure 22:
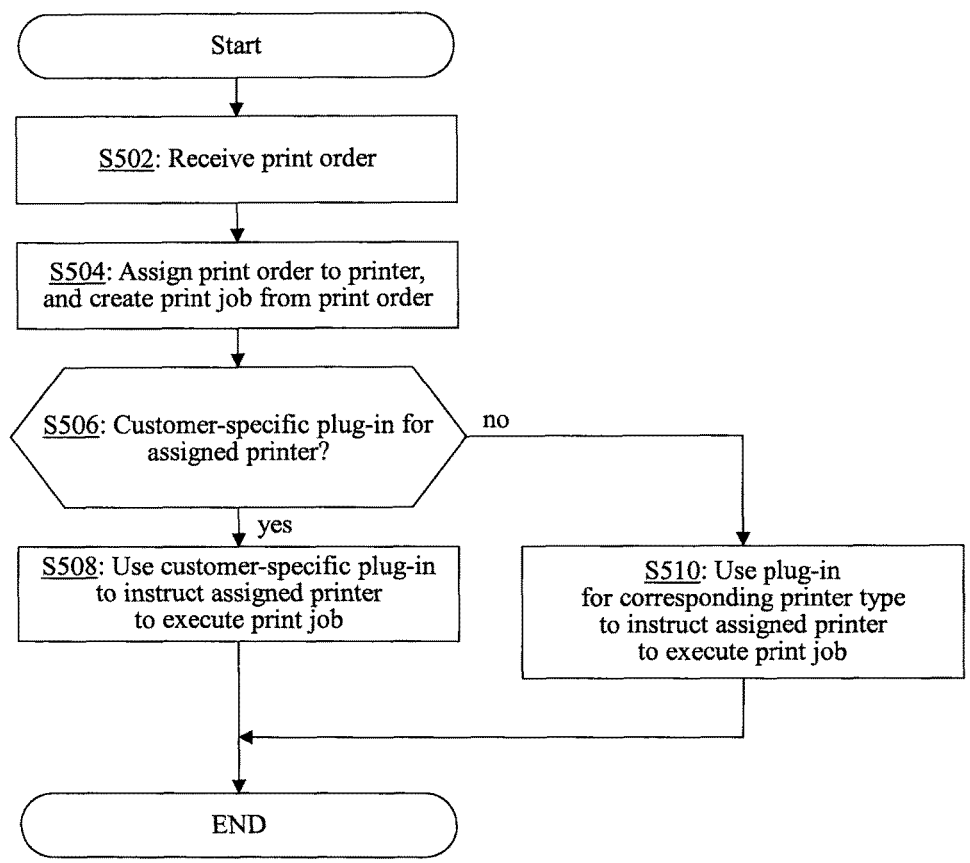
FIG. 22 is a flow diagram showing an example method for print management using the plug-ins of FIGS. 6 and 20.

FIG. 22 shows an example print management method that can be performed with system 10 of FIGS. 1-9, 11, 12, 14, 15, 17 and 18 or by another system. At block S502, server 14 receives print order 16. Print order 16 includes information identifying a specific customer associated with print order 16. At block S504, job dispatcher submodule 80E assigns print order 16 to a printer. Job dispatcher 80E analyzes job ticket 88 as part of the assignment process. If the print process requirements defined in job ticket 88 match capabilities of one of printers 18, then job dispatcher 80E assigns print order 16 to that printer. For example, if the print process requirements (2-sided BW printing on tabloid sheet size) defined in job ticket 88 match capabilities of printer 18E in a lookup table, then job dispatcher 80E may assign print order 16 to printer 18E. Also at block S504, device manager 82 creates a print job from print order 16.

At block S506, plug-in manager 92 determines whether print server 14 has a customer-specific plug-in corresponding to the customer from which print order 16 was received. As previously mentioned, print order 16 includes information identifying a specific customer. Plug-in manager 92 may compare that information with a listing of the plug-ins that are available. For example, if print order 16 belongs to customer C1 and printer 18E (type P1) was selected at block S504, plug-in manager 92 determines whether print server 14 has customer-specific plug-in 500 (FIG. 14) for customer C1 for use with type P1 printers.

When print server 14 is determined to have the corresponding customer-specific plug-in (S506:YES), then at block S508 the print order is completed by using the customer-specific plug-in to instruct the selected printer to execute the print job. For example, if customer-specific plug-in 500 was found at block S506, the print order is completed by using customer-specific plug-in 500 to instruct printer 18E to execute the print job.

When print server 14 is determined to not have the corresponding customer-specific plug-in (S514:NO), then at block S510 the print order is completed by using a first plug-in (not a customer-specific plug-in) to instruct the selected printer to execute the print job. The first plug-in can be a plug-in corresponding to the printer type of the selected printer. For example, if customer-specific plug-in 500 was not found at block S514, plug-in 91A of FIG. 6 (an example of a first plug-in) is used to instruct printer 18E to execute the print job.

Use of customer-specific plug-in 500 can have advantages over plug-in 91B, which is generic to type 2 printers, by increasing efficiency in creating a job ticket. For example, we assume that type P1 printers are capable of multiple finishing operations, namely stapling, various types of folding, and others. Also, Customer C1 always sends print orders to make brochures that are stapled on the top left and booklet folded. The customer specific plug-in for type P1 printers+ Customer C1 would create a JDF job ticket by skipping or omitting options for all finishing operations except for stapling and folding. Furthermore, the customer-specific plug-in may omit options for all folding operations except for booklet folding. That is, the JDF job ticket does not include options for any finishing operation except for stapling and booklet folding.

Plug-in manager may store information about use time of various plug-ins. Server 14 may display the information on server display 35. Server 14 may analyze the information to determine whether a group plug-in or other type of plug-in should be installed on server 14.

Figure 23:
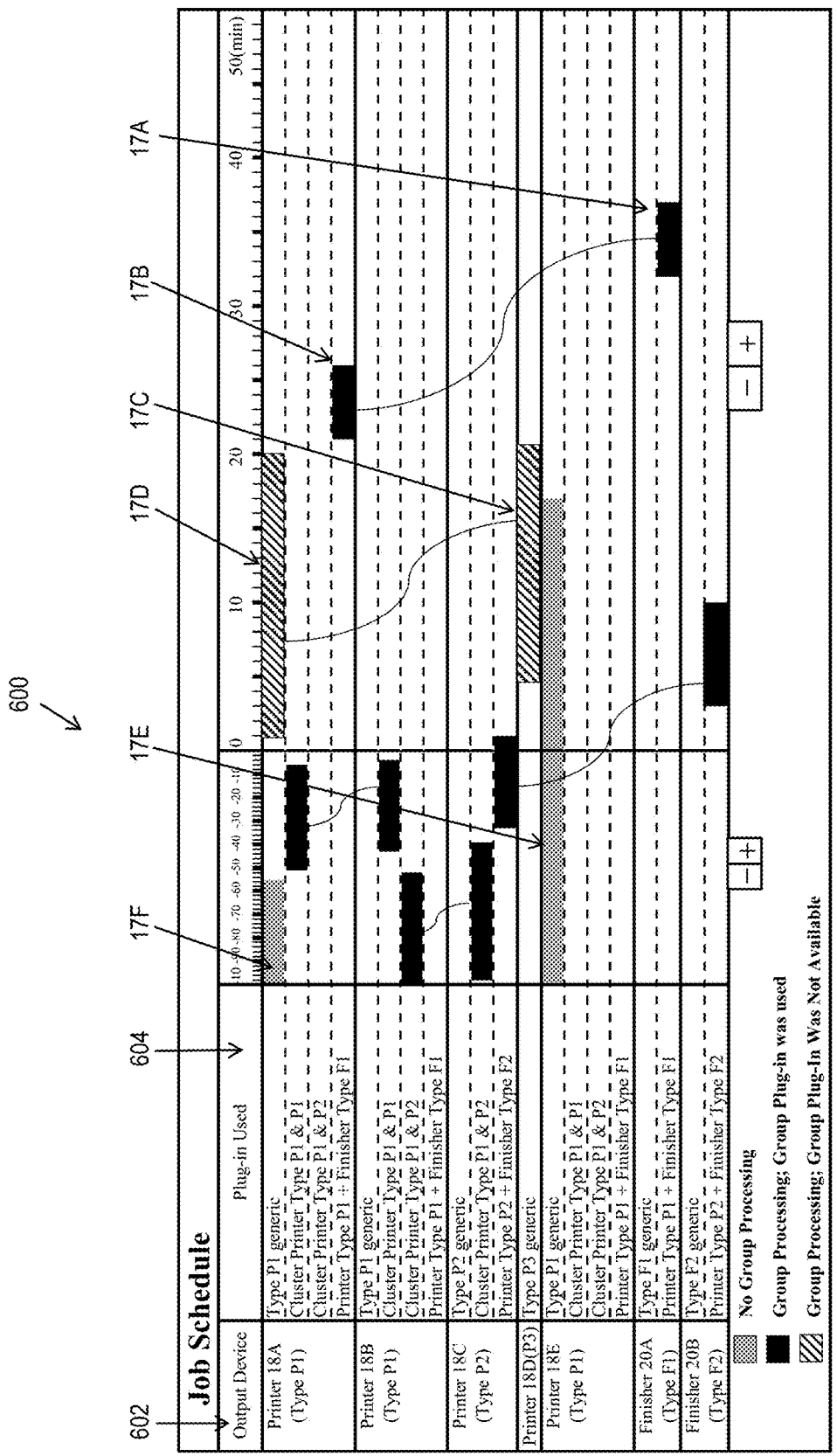
FIG. 23 is table showing example information about use time of various plug-ins, which use times may be analyzed by the print server.

FIG. 23 shows information 600 about use time of various plug-ins that may be displayed on server display 35. Column 602 lists the output devices 18, 20 connected to server 14. Column 604 lists the plug-ins that were used to complete print jobs.

The gray, black, and striped bars represent print jobs performed over time. The horizontal length of the bars represent use time of the plug-ins and the time duration for completing the print job. The plug-in use times and print job time durations are stored in server memory 31. The left end of the bar represents the print job start time, and the right end of the bar represents the print job finish time. The gray bars are print jobs 17 of print orders 16 that were completed without group process, meaning that only a single output device was used to complete the print order.

The back bars and striped bars represent child jobs 17 of print orders 16 that were completed with group processing, meaning that at least two output devices were used to complete the print order. The child jobs belonging to the same print order are connected with a curved line. Referring to black bar child jobs 17A and 17B, a group plug-in (e.g., plug-in 93C of FIG. 11) was found to be installed at block S214 of FIG. 13, and the print order was completed by using the group plug-in to instruct printer 18A and finisher 20A to execute child jobs 17A and 17B.

For the striped bar child jobs 17C and 17D in FIG. 23, a group plug-in was not found to be installed at block S114 of FIG. 10. That is, there was no group plug-in available for cluster printer type P1 and P3. The print order was completed by using a first plug-in based on printer type (e.g., plug-in 91A of FIG. 6) to instruct printer 18A to execute child job 17C, and by using a second plug-in based on printer type (e.g., plug-in 91C of FIG. 6) to instruct printer 18D to execute child job 17D.

Server 14 may analyze the duration and/or quantity of child jobs (e.g., 17C and 17D) that were not executed with a group plug-in. If the durations exceeds a time threshold and/or the quantity exceeds a quantity threshold, then server 14 may indicate a need for a corresponding group plug-in. For example, if the duration of the a first child job and the duration a second child job, individually or combined, exceed a time duration, then server 14 may indicate a need for a corresponding group plug-in.

As a further example, server 14 may analyze the duration and/or quantity of print jobs (e.g., 17E and 17F) that each used a plug-in based printer type and involved no group processing, meaning that the print orders were completed by a single output device. If the duration exceeds a time threshold and/or the quantity exceeds a quantity threshold, then server 14 may indicate a need for a corresponding printer-specific plug-in.

Information table 600 may include additional columns that indicate the printer setting (print process requirements) and/or customer identification. As in the two examples above, server 14 may analyze the duration and/or quantity of print jobs for printer settings to indicate a need for a new setting-specific plug-in and/or customer-specific plug-in.

The need for a new plug-in (e.g., a group plug-in, printer-specific plug-in, setting-specific plug-in, or customer-specific plug-in) may be indicated on server display 35 so that the user can be instructed to install the new plug-in. The new plug-in may be generated by server 14. The new-plug in may be generated by a software engineer at the print shop, by the customer, or by the output device manufacturer.

Figure 24:
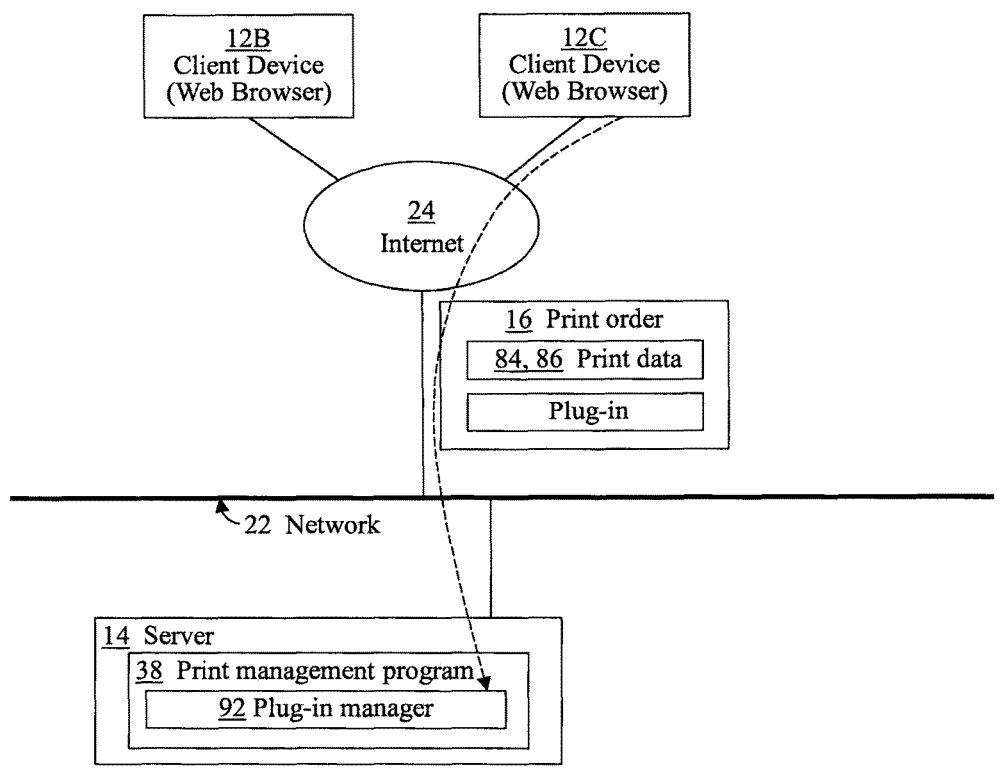
FIGS. 24 and 25 are schematic block diagrams showing example transmission routes of plug-ins to the print server.

As shown in FIG. 24, any of the above-described plug-ins may be received by server 14 from a client-side user (e.g., customer of the print shop) via the client device operated by the customer. For example, customer-specific plug-in 500 (FIG. 20) may be received by server 14 from any client device 12. The plug-in may be included with print order 16. Print order 16 including the plug-in may be sent using the web browser of client device 12 and transmitted via the Internet 24 and network 22 to server 14.

Figure 25:
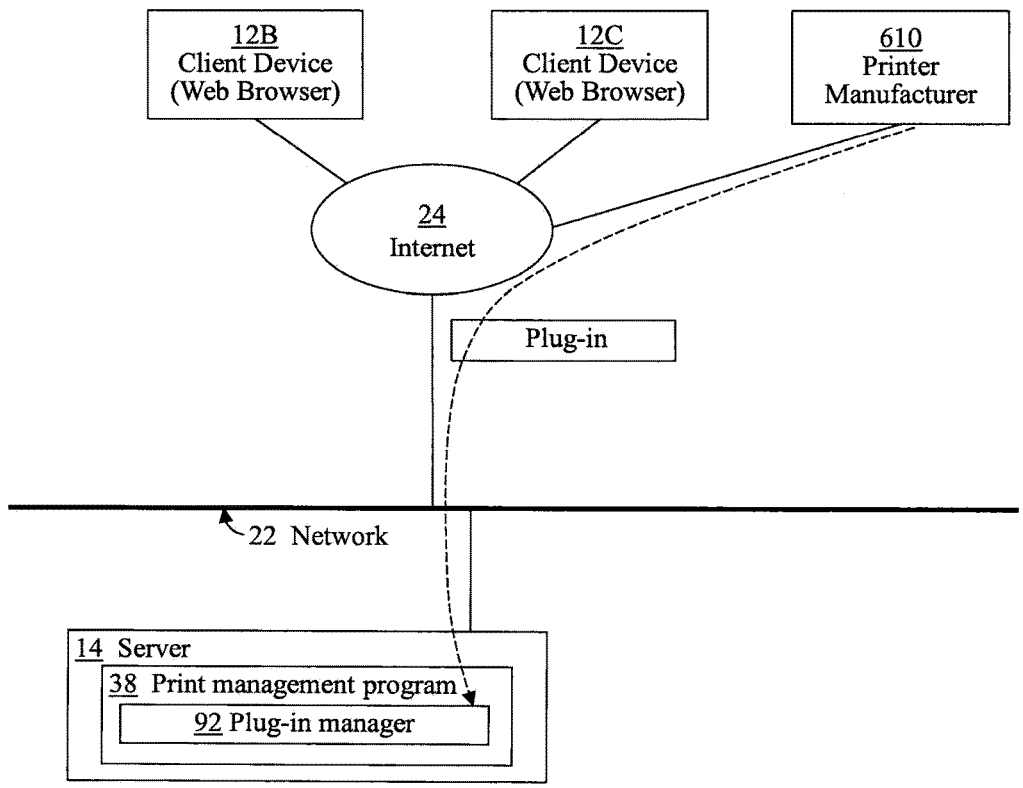

As shown in FIG. 25, any of the above-described plug-ins may be received by server 14 from printer manufacturer 610. For example, printer-specific plug-in 300 (FIG. 15) may be received by server 14 from printer manufacturer 610. Block 610, representing the printer manufacturer, may be a computer or device similar to any of client devices 12 capable of transmitting the plug in via the Internet 24 and network 22 to server 14.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A print management method comprising:
receiving a print order at a print server;
determining whether the received print order is to be split among plural output devices, the plural output devices including a first output device and a second output device, the determining performed by searching for a parameter value associated with the print order, the parameter value prohibiting that the print order be split among plural output device;
in response to a determination that the print order is to be split among plural output devices, determining whether the print server has a group plug-in corresponding to both the first output device and the second output device, the group plug-in enabling the print server to communicate with both the first output device and the second output device to complete the print order;
creating a first child job and a second child job from the print order;
assigning the first child job to the first output device;
assigning the second child job to the second output device;
in response to a determination that the print server has the group plug-in, completing the print order by using the group plug-in to instruct the first output device to execute the first child job and to instruct the second output device to execute the second child job; and
in response to a determination that the print server does not have the group plug-in, completing the print order by using a first plug-in to instruct the first output device to execute the first child job, and using a second plug-in to instruct the second output device to execute the second child job.

2. The method of claim 1, wherein the print order defines pages of a single document to be printed, the first child job defines a first group of the pages, the second child job defines a second group of the pages different from the first group, the first output device is a first printer that prints the first group, the second output device is a second printer that prints the second group.

3. The method of claim 1, wherein the print order defines pages of a document to be printed and defines a finishing operation, the first output device is printer that prints the pages, and the second output device is a finisher that performs the finishing operation on the pages printed by the first output device, wherein finisher does not have a print assembly for printing.

4. The method of claim 1, further comprising, using the group plug-in when the print server is determined to have the group plug-in, to perform at least one of:
receiving constraint information from at least one of the first output device and the second output device;
receiving identifying information from the first output device and the second output device, the identifying information including machine names or locations of the first output device and the second output device;
receiving audit information from the first or second output device, the audit information including information about a numerical quantity of pages processed by the first or second output device; and
receiving a paper catalog from the first or second output device, the paper catalog including catalog names, each catalog name corresponding to a group of paper-related settings associated with a paper tray of the first or second output device.

5. The method of claim 1, wherein when the print server is determined to have the group plug-in, the creating of the first child job and the second child job is performed by the print server using the group plug-in.

6. The method of claim 5,
wherein a print management program executed by the print server performs the determination, based on information in the print order, of whether the received print order is to be split among plural output devices, and
wherein when the print server is determined to not have the group plug-in, the creating of the first child job and the second child job is performed by the print management program.

7. The method of claim 1, wherein when the print server is determined to have the group plug-in, the use of the group plug-in to instruct the first output device includes:
the print server creating a first job ticket using the group plug-in, the first job ticket including print process requirements to be followed by the first output device;
the print server sending the first job ticket to the first output device;
the print server creating a second job ticket using the group plug-in, the second job ticket including print process requirements to be followed by the second output device; and
the print server sending the second job ticket to the second output device.

8. The method of claim 7, wherein when the print server is determined to not have the group plug-in,
the use of the first plug-in to instruct the first output device includes:
the print server creating a first job ticket using the first plug-in, the first job ticket including print process requirements to be followed by the first output device, and the print server sending the first job ticket to the first output device; and
the use of the second plug-in to instruct the second output device includes:
the print server creating a second job ticket using the second plug-in, the second job ticket including print process requirements to be followed by the second output device, and
the print server sending the second job ticket to the second output device.

9. The method of claim 1, further comprising:
storing a time duration of the first child job and a time duration the second child job;
analyzing the time durations to determine whether the time durations exceed a time threshold; and
indicating a need for a new plug-in to be installed when time durations exceed the threshold.

10. A print server in communication with plural output devices, the print server executing a print management program to perform a print management method comprising:
receiving a print order at a print server;
determining whether the received print order is to be split among the plural output devices, the plural output devices including a first output device and a second output device, the determining performed by searching for a parameter value associated with the print order, the parameter value prohibiting that the print order be split among plural output device;
in response to a determination that the print order is to be split among plural output devices, determining whether the print server has a group plug-in corresponding to both the first output device and the second output device, the group plug-in enabling the print server to communicate with both the first output device and the second output device to complete the print order;
creating a first child job and a second child job from the print order;
assigning the first child job to the first output device;
assigning the second child job to the second output device;
in response to a determination that the print server has the group plug-in, completing the print order by using the group plug-in to instruct the first output device to execute the first child job and to instruct the second output device to execute the second child job; and
in response to a determination that the print server does not have the group plug-in, completing the print order by using a first plug-in to instruct the first output device to execute the first child job, and using a second plug-in to instruct the second output device to execute the second child job.

11. The print server of claim 10, wherein the print order defines pages of a single document to be printed, the first child job defines a first group of the pages, the second child job defines a second group of the pages different from the first group, the first output device is a first printer that prints the first group, the second output device is a second printer that prints the second group.

12. The print server of claim 10, wherein the print order defines pages of a document to be printed and defines a finishing operation, the first output device is printer that prints the pages, and the second output device is a finisher that performs the finishing operation on the pages printed by the first output device, wherein finisher does not have a print assembly for printing.

13. The print server of claim 10, wherein the print management method performed by the print server further comprises using the group plug-in when the print server is determined to have the group plug-in, to perform at least one of:
receiving constraint information from at least one of the first output device and the second output device;
receiving identifying information from the first output device and the second output device, the identifying information including machine names or locations of the first output device and the second output device;
receiving audit information from the first or second output device, the audit information including information about a numerical quantity of pages processed by the first or second output device; and
receiving a paper catalog from the first or second output device, the paper catalog including catalog names, each catalog name corresponding to a group of paper-related settings associated with a paper tray of the first or second output device.

14. The print server of claim 10, wherein when the print server is determined to have the group plug-in, the creating of the first child job and the second child job is performed by the print server using the group plug-in.

15. The print server of claim 14,
wherein the determination, of whether the received print order is to be split among plural output devices, is performed by the print server based on information in the print order; and
wherein when the print server is determined to not have the group plug-in, the creating of the first child job and the second child job is performed by print server using the print management program.

16. The print server of claim 10, wherein when the print server is determined to have the group plug-in, the use of the group plug-in to instruct the first output device includes:

the print server creating a first job ticket using the group plug-in, the first job ticket including print process requirements to be followed by the first output device;

the print server sending the first job ticket to the first output device;

the print server creating a second job ticket using the group plug-in, the second job ticket including print process requirements to be followed by the second output device; and the print server sending the second job ticket to the second output device.

17. The print server of claim 16, wherein when the print server is determined to not have the group plug-in, the use of the first plug-in to instruct the first output device includes:

the print server creating a first job ticket using the first plug-in, the first job ticket including print process requirements to be followed by the first output device, and the print server sending the first job ticket to the first output device; and the use of the second plug-in to instruct the second output device includes:

the print server creating a second job ticket using the second plug-in, the second job ticket including print process requirements to be followed by the second output device, and the print server sending the second job ticket to the second output device.

18. The print server of claim 10, wherein the print management method performed by the print server further comprises:

storing a time duration of the first child job and a time duration the second child job;

analyzing the time durations to determine whether the time durations exceed a time threshold; and indicating a need for a new plug-in to be installed when time durations exceed the threshold.

19. A non-transitory computer readable medium having stored thereon computer readable instructions that, when executed by a server processor of a print server, cause the print server to perform a process for print management, the process comprising:

receiving a print order at the print server;

determining whether the received print order is to be split among plural output devices, the plural output devices including a first output device and a second output device, the determining performed by searching for a parameter value associated with the print order, the parameter value prohibiting that the print order be split among plural output device;

in response to a determination that the print order is to be split among plural output devices, determining whether the print server has a group plug-in corresponding to both the first output device and the second output device, the group plug-in enabling the print server to communicate with both the first output device and the second output device to complete the print order;

creating a first child job and a second child job from the print order;

assigning the first child job to the first output device;

assigning the second child job to the second output device;

in response to a determination that the print server has the group plug-in, completing the print order by using the group plug-in to instruct the first output device to execute the first child job and to instruct the second output device to execute the second child job; and in response to a determination that the print server does to not have the group plug-in, completing the print order by using a first plug-in to instruct the first output device to execute the first child job, and using a second plug-in to instruct the second output device to execute the second child job.

20. The non-transitory computer readable medium of claim 19, wherein the print order defines pages of a single document to be printed, the first child job defines a first group of the pages, the second child job defines a second group of the pages different from the first group, the first output device is a first printer that prints the first group, the second output device is a second printer that prints the second group.

* * * * *